US010853276B2

(12) United States Patent
Ahsan et al.

(10) Patent No.: US 10,853,276 B2
(45) Date of Patent: *Dec. 1, 2020

(54) EXECUTING DISTRIBUTED MEMORY OPERATIONS USING PROCESSING ELEMENTS CONNECTED BY DISTRIBUTED CHANNELS

(71) Applicant: Intel Corporation, Santa Clara, CA (US)

(72) Inventors: Bushra Ahsan, Hudson, MA (US);
Michael C. Adler, Newton, MA (US);
Neal C. Crago, Amherst, MA (US);
Joel S. Emer, Hudson, MA (US);
Aamer Jaleel, Northborough, MA (US);
Angshuman Parashar, Hudson, MA (US); Michael I. Pellauer, Cambridge, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,717

(22) Filed: Jun. 17, 2019

(65) Prior Publication Data

US 2019/0303312 A1 Oct. 3, 2019

Related U.S. Application Data

(63) Continuation of application No. 14/037,468, filed on Sep. 26, 2013, now Pat. No. 10,331,583.

(51) Int. Cl.
*G06F 13/16* (2006.01)
*G06F 12/06* (2006.01)

(52) U.S. Cl.
CPC ...... *G06F 13/1663* (2013.01); *G06F 13/1652* (2013.01); *G06F 13/1684* (2013.01); *G06F 12/0646* (2013.01); *G06F 2213/00* (2013.01)

(58) Field of Classification Search
CPC ............. G06F 13/1663; G06F 13/1684; G06F 13/1652; G06F 13/120646; G06F 2213/00
See application file for complete search history.

(56) References Cited

U.S. PATENT DOCUMENTS

| 672,177 A | 4/1901 | Metcalf |
| 4,965,716 A | 10/1990 | Sweeney |

(Continued)

FOREIGN PATENT DOCUMENTS

| EP | 0410777 A2 | 1/1991 |
| EP | 2317446 A1 | 5/2011 |

(Continued)

OTHER PUBLICATIONS

Final office action from U.S. Appl. No. 15/640,542, dated Aug. 7, 2019, 46 pages.

(Continued)

*Primary Examiner* — Hiep T Nguyen
(74) *Attorney, Agent, or Firm* — Nicholson De Vos Webster & Elliott LLP

(57) ABSTRACT

A technology for implementing a method for distributed memory operations. A method of the disclosure includes obtaining distributed channel information for an algorithm to be executed by a plurality of spatially distributed processing elements. For each distributed channel in the distributed channel information, the method further associates one or more of the plurality of spatially distributed processing elements with the distributed channel based on the algorithm.

24 Claims, 15 Drawing Sheets

(56) References Cited

U.S. PATENT DOCUMENTS

| | | |
|---|---|---|
| 5,093,920 A | 3/1992 | Agrawal et al. |
| 5,141,747 A | 8/1992 | Scholz |
| 5,239,634 A | 8/1993 | Buch et al. |
| 5,241,635 A | 8/1993 | Papadopoulos et al. |
| 5,314,503 A | 5/1994 | Bobrove et al. |
| 5,393,454 A | 2/1995 | Mondin et al. |
| 5,393,536 A | 2/1995 | Brandt et al. |
| 5,410,722 A | 4/1995 | Cornaby |
| 5,465,368 A | 11/1995 | Davidson et al. |
| 5,502,661 A | 3/1996 | Glunz |
| 5,560,032 A | 9/1996 | Nguyen et al. |
| 5,574,944 A | 11/1996 | Stager |
| 5,581,767 A | 12/1996 | Katsuki et al. |
| 5,604,120 A | 2/1997 | Yano et al. |
| 5,625,630 A | 4/1997 | Abramovici et al. |
| 5,655,096 A | 8/1997 | Branigin |
| 5,689,719 A | 11/1997 | Miura et al. |
| 5,725,364 A | 3/1998 | Mirazita |
| 5,787,029 A | 7/1998 | De Angel |
| 5,790,821 A | 8/1998 | Pflum |
| 5,805,827 A | 9/1998 | Chau et al. |
| 5,925,099 A | 7/1999 | Futral et al. |
| 5,930,484 A | 7/1999 | Tran et al. |
| 5,933,429 A | 8/1999 | Bubenik et al. |
| 5,948,081 A | 9/1999 | Foster |
| 6,020,139 A | 2/2000 | Schwartz et al. |
| 6,088,780 A | 7/2000 | Yamada et al. |
| 6,141,747 A | 10/2000 | Witt |
| 6,205,533 B1 | 3/2001 | Margolus |
| 6,247,064 B1 | 6/2001 | Alferness et al. |
| 6,314,503 B1 | 11/2001 | D et al. |
| 6,393,454 B1 | 5/2002 | Chu |
| 6,393,536 B1 | 5/2002 | Hughes et al. |
| 6,460,131 B1 | 10/2002 | Trimberger |
| 6,507,947 B1 | 1/2003 | Schreiber et al. |
| 6,515,333 B1 | 2/2003 | Riccobene |
| 6,553,448 B1 | 4/2003 | Mannion |
| 6,553,482 B1 | 4/2003 | Witt |
| 6,604,120 B1 | 8/2003 | De Angel |
| 6,615,333 B1 | 9/2003 | Hoogerbrugge et al. |
| 6,640,267 B1 | 10/2003 | Raza |
| 6,721,774 B1 | 4/2004 | Lee et al. |
| 6,725,364 B1 | 4/2004 | Crabill |
| 6,728,945 B1 | 4/2004 | Wang |
| 6,886,085 B1 | 4/2005 | Shuf et al. |
| 6,947,416 B1 | 9/2005 | Nee et al. |
| 7,000,072 B1 | 2/2006 | Aisaka et al. |
| 7,058,785 B1 | 6/2006 | Ochotta |
| 7,181,578 B1 | 2/2007 | Guha et al. |
| 7,200,137 B2 | 4/2007 | Dorr et al. |
| 7,203,936 B2 | 4/2007 | Gillies et al. |
| 7,257,665 B2 | 8/2007 | Niell et al. |
| 7,290,096 B2 | 10/2007 | Jeter, Jr. et al. |
| 7,308,514 B1 | 12/2007 | Hewitt et al. |
| 7,379,067 B2 | 5/2008 | Deering et al. |
| 7,380,108 B1 | 5/2008 | Uht et al. |
| 7,486,678 B1 | 2/2009 | Devanagondi et al. |
| 7,509,484 B1 | 3/2009 | Golla et al. |
| 7,546,331 B2 | 6/2009 | Islam |
| 7,630,324 B2 | 12/2009 | Li et al. |
| 7,660,911 B2 | 2/2010 | McDaniel |
| 7,724,740 B1 | 5/2010 | Wang et al. |
| 7,817,652 B1 | 10/2010 | MacAdam et al. |
| 7,911,960 B1 | 3/2011 | Aydemir et al. |
| 7,936,753 B1 | 5/2011 | Colloff et al. |
| 7,987,479 B1 | 7/2011 | Day |
| 8,001,510 B1 | 8/2011 | Miller et al. |
| 8,010,766 B2 | 8/2011 | Bhattacharjee et al. |
| 8,051,227 B1 | 11/2011 | Gewirtz et al. |
| 8,055,880 B2 | 11/2011 | Fujisawa et al. |
| 8,115,659 B2 | 2/2012 | Hurley et al. |
| 8,156,284 B2 | 4/2012 | Vorbach et al. |
| 8,160,975 B2 | 4/2012 | Tang et al. |
| 8,225,073 B2 | 7/2012 | Master et al. |
| 8,332,597 B1 | 12/2012 | Bennett |
| 8,356,162 B2 | 1/2013 | Muff et al. |
| 8,495,341 B2 | 7/2013 | Busaba et al. |
| 8,561,194 B2 | 10/2013 | Lee |
| 8,578,117 B2 | 11/2013 | Burda et al. |
| 8,619,800 B1 | 12/2013 | Finney et al. |
| 8,806,248 B2 | 8/2014 | Allarey et al. |
| 8,812,820 B2 | 8/2014 | Vorbach et al. |
| 8,924,596 B1 | 12/2014 | Beeson et al. |
| 8,935,515 B2 | 1/2015 | Colavin et al. |
| 8,966,457 B2 | 2/2015 | Ebcioglu et al. |
| 8,990,452 B2 | 3/2015 | Branson et al. |
| 9,009,712 B2 | 4/2015 | Schmit et al. |
| 9,026,705 B2 | 5/2015 | Feehrer et al. |
| 9,026,769 B1 | 5/2015 | Jamil et al. |
| 9,052,890 B2 | 6/2015 | Phillips et al. |
| 9,104,474 B2 | 8/2015 | Kaul et al. |
| 9,110,846 B2 | 8/2015 | Buchheit et al. |
| 9,135,057 B2 | 9/2015 | Branson et al. |
| 9,170,846 B2 | 10/2015 | Delling et al. |
| 9,213,571 B2 | 12/2015 | Ristovski et al. |
| 9,268,528 B2 | 2/2016 | Tannenbaum et al. |
| 9,268,704 B2 | 2/2016 | Fleischer et al. |
| 9,285,860 B2 | 3/2016 | Hofmann |
| 9,429,983 B1 | 8/2016 | Chall et al. |
| 9,473,144 B1 | 10/2016 | Thiagarajan et al. |
| 9,520,876 B1 | 12/2016 | Chadwick et al. |
| 9,594,521 B2 | 3/2017 | Blagodurov et al. |
| 9,658,676 B1 | 5/2017 | Witek et al. |
| 9,696,928 B2 | 7/2017 | Cain et al. |
| 9,753,658 B2 | 9/2017 | Beeson et al. |
| 9,760,291 B2 | 9/2017 | Beale et al. |
| 9,762,563 B2 | 9/2017 | Davis et al. |
| 9,847,783 B1 | 12/2017 | Teh et al. |
| 9,886,072 B1 | 2/2018 | Venkataraman |
| 9,923,905 B2 | 3/2018 | Amiri et al. |
| 9,946,718 B2 | 4/2018 | Bowman et al. |
| 10,108,417 B2 | 10/2018 | Krishna et al. |
| 10,187,467 B2 | 1/2019 | Nagai |
| 10,331,583 B2 * | 6/2019 | Ahsan ............ G06F 13/1663 |
| 10,467,183 B2 | 11/2019 | Fleming et al. |
| 2002/0026493 A1 | 2/2002 | Scardamalia et al. |
| 2002/0090751 A1 | 7/2002 | Grigg et al. |
| 2002/0103943 A1 | 8/2002 | Lo et al. |
| 2002/0178285 A1 | 11/2002 | Donaldson et al. |
| 2002/0184291 A1 | 12/2002 | Hogenauer |
| 2003/0023830 A1 | 1/2003 | Hogenauer |
| 2003/0028750 A1 | 2/2003 | Hogenauer |
| 2003/0120802 A1 | 6/2003 | Kohno |
| 2003/0126233 A1 | 7/2003 | Bryers et al. |
| 2003/0163649 A1 | 8/2003 | Kapur et al. |
| 2003/0177320 A1 | 9/2003 | Sah et al. |
| 2003/0212726 A1 | 11/2003 | Luick |
| 2003/0225814 A1 | 12/2003 | Saito et al. |
| 2003/0233643 A1 | 12/2003 | Thompson et al. |
| 2004/0001458 A1 | 1/2004 | Dorenbosch et al. |
| 2004/0017807 A1 | 1/2004 | Dorr et al. |
| 2004/0017820 A1 | 1/2004 | Garinger et al. |
| 2004/0022094 A1 | 2/2004 | Radhakrishnan et al. |
| 2004/0022107 A1 | 2/2004 | Zaidi et al. |
| 2004/0044877 A1 | 3/2004 | Myers |
| 2004/0054818 A1 | 3/2004 | Kirsch |
| 2004/0103230 A1 | 5/2004 | Emerson et al. |
| 2004/0124877 A1 | 7/2004 | Parkes |
| 2004/0128401 A1 | 7/2004 | Fallon et al. |
| 2004/0230849 A1 | 11/2004 | Dhong et al. |
| 2004/0263524 A1 | 12/2004 | Lippincott |
| 2005/0025120 A1 | 2/2005 | O'Toole et al. |
| 2005/0076187 A1 | 4/2005 | Claydon |
| 2005/0108776 A1 | 5/2005 | Carver et al. |
| 2005/0134308 A1 | 6/2005 | Okada et al. |
| 2005/0138323 A1 | 6/2005 | Snyder |
| 2005/0166038 A1 | 7/2005 | Wang et al. |
| 2005/0172103 A1 | 8/2005 | Inuo et al. |
| 2005/0223131 A1 | 10/2005 | Goekjian et al. |
| 2006/0026359 A1 | 2/2006 | Ross et al. |
| 2006/0041872 A1 | 2/2006 | Poznanovic et al. |
| 2006/0101237 A1 | 5/2006 | Mohl et al. |
| 2006/0130030 A1 | 6/2006 | Kwiat et al. |
| 2006/0179255 A1 | 8/2006 | Yamazaki |

(56) References Cited

U.S. PATENT DOCUMENTS

| | | |
|---|---|---|
| 2006/0179429 A1 | 8/2006 | Eggers et al. |
| 2006/0200647 A1 | 9/2006 | Cohen |
| 2006/0221931 A1 | 10/2006 | Apostol et al. |
| 2006/0236008 A1 | 10/2006 | Asano et al. |
| 2007/0011436 A1 | 1/2007 | Bittner, Jr. |
| 2007/0033369 A1 | 2/2007 | Kasama et al. |
| 2007/0074014 A1 | 3/2007 | Musoll et al. |
| 2007/0079036 A1 | 4/2007 | Mukherjee |
| 2007/0118332 A1 | 5/2007 | Meyers et al. |
| 2007/0143546 A1 | 6/2007 | Narad |
| 2007/0180315 A1 | 8/2007 | Aizawa |
| 2007/0203967 A1 | 8/2007 | Dockser |
| 2007/0204137 A1 | 8/2007 | Tran |
| 2007/0226458 A1 | 9/2007 | Stuttard et al. |
| 2007/0266223 A1 | 11/2007 | Nguyen |
| 2007/0276976 A1 | 11/2007 | Gower et al. |
| 2007/0299980 A1 | 12/2007 | Amini et al. |
| 2008/0005392 A1 | 1/2008 | Amini et al. |
| 2008/0072113 A1 | 3/2008 | Tsang et al. |
| 2008/0082794 A1 | 4/2008 | Yu et al. |
| 2008/0133889 A1 | 6/2008 | Glew |
| 2008/0133895 A1 | 6/2008 | Sivtsov et al. |
| 2008/0155135 A1 | 6/2008 | Garg et al. |
| 2008/0184255 A1 | 7/2008 | Watanabe et al. |
| 2008/0218203 A1 | 9/2008 | Arriens et al. |
| 2008/0263330 A1 | 10/2008 | May et al. |
| 2008/0270689 A1 | 10/2008 | Gotoh |
| 2008/0307258 A1 | 12/2008 | Challenger et al. |
| 2009/0013329 A1 | 1/2009 | May et al. |
| 2009/0037697 A1 | 2/2009 | Ramani et al. |
| 2009/0055624 A1 | 2/2009 | Kirsch |
| 2009/0063665 A1 | 3/2009 | Bagepalli et al. |
| 2009/0113169 A1 | 4/2009 | Yang et al. |
| 2009/0119456 A1 | 5/2009 | Park et al. |
| 2009/0133023 A1 | 5/2009 | Li et al. |
| 2009/0175444 A1 | 7/2009 | Douglis et al. |
| 2009/0182993 A1 | 7/2009 | Fant |
| 2009/0300324 A1 | 12/2009 | Inuo |
| 2009/0300325 A1 | 12/2009 | Paver et al. |
| 2009/0300388 A1 | 12/2009 | Mantor et al. |
| 2009/0309884 A1 | 12/2009 | Lippincott et al. |
| 2009/0328048 A1 | 12/2009 | Khan et al. |
| 2010/0017761 A1 | 1/2010 | Higuchi et al. |
| 2010/0115168 A1 | 5/2010 | Bekooij |
| 2010/0180105 A1 | 7/2010 | Asnaashari |
| 2010/0191911 A1 | 7/2010 | Heddes et al. |
| 2010/0217915 A1 | 8/2010 | O'Connor et al. |
| 2010/0228885 A1 | 9/2010 | McDaniel |
| 2010/0228925 A1 | 9/2010 | Doerr et al. |
| 2010/0254262 A1 | 10/2010 | Kantawala et al. |
| 2010/0262721 A1 | 10/2010 | Asnaashari et al. |
| 2010/0302946 A1 | 12/2010 | Yang et al. |
| 2011/0004742 A1 | 1/2011 | Hassan |
| 2011/0008300 A1 | 1/2011 | Wouters et al. |
| 2011/0040822 A1 | 2/2011 | Eichenberger et al. |
| 2011/0083000 A1 | 4/2011 | Rhoades et al. |
| 2011/0099295 A1 | 4/2011 | Wegener |
| 2011/0107337 A1 | 5/2011 | Cambonie |
| 2011/0133825 A1 | 6/2011 | Jones et al. |
| 2011/0202747 A1 | 8/2011 | Busaba et al. |
| 2011/0292708 A1 | 12/2011 | Kang et al. |
| 2011/0302358 A1 | 12/2011 | Yu et al. |
| 2011/0314238 A1 | 12/2011 | Finkler et al. |
| 2011/0320724 A1 | 12/2011 | Mejdrich et al. |
| 2012/0017066 A1 | 1/2012 | Vorbach et al. |
| 2012/0066483 A1 | 3/2012 | Boury et al. |
| 2012/0079168 A1 | 3/2012 | Chou et al. |
| 2012/0089812 A1 | 4/2012 | Smith |
| 2012/0124117 A1 | 5/2012 | Yu et al. |
| 2012/0126850 A1 | 5/2012 | Wasson et al. |
| 2012/0126851 A1 | 5/2012 | Kelem et al. |
| 2012/0128107 A1 | 5/2012 | Oren |
| 2012/0144126 A1* | 6/2012 | Nimmala .............. G06F 12/084 711/141 |
| 2012/0174118 A1 | 7/2012 | Watanabe et al. |
| 2012/0239853 A1 | 9/2012 | Moshayedi |
| 2012/0260239 A1 | 10/2012 | Martinez et al. |
| 2012/0278543 A1 | 11/2012 | Yu et al. |
| 2012/0278587 A1 | 11/2012 | Caufield et al. |
| 2012/0303932 A1 | 11/2012 | Farabet et al. |
| 2012/0303933 A1 | 11/2012 | Manet et al. |
| 2012/0317388 A1 | 12/2012 | Driever et al. |
| 2012/0324180 A1 | 12/2012 | Asnaashari et al. |
| 2012/0330701 A1 | 12/2012 | Hyder et al. |
| 2013/0021058 A1 | 1/2013 | Huang et al. |
| 2013/0024875 A1 | 1/2013 | Wang et al. |
| 2013/0036287 A1 | 2/2013 | Chu et al. |
| 2013/0067138 A1 | 3/2013 | Schuette et al. |
| 2013/0080652 A1 | 3/2013 | Cradick et al. |
| 2013/0080993 A1 | 3/2013 | Stravers et al. |
| 2013/0081042 A1 | 3/2013 | Branson et al. |
| 2013/0125127 A1 | 5/2013 | Mital et al. |
| 2013/0145203 A1 | 6/2013 | Fawcett |
| 2013/0147515 A1 | 6/2013 | Wasson et al. |
| 2013/0151919 A1 | 6/2013 | Huynh |
| 2013/0160028 A1 | 6/2013 | Black |
| 2013/0166879 A1 | 6/2013 | Sun et al. |
| 2013/0315211 A1 | 11/2013 | Balan et al. |
| 2014/0032860 A1 | 1/2014 | Yamada et al. |
| 2014/0052955 A1 | 2/2014 | Moll et al. |
| 2014/0098890 A1 | 4/2014 | Sermadevi et al. |
| 2014/0115300 A1 | 4/2014 | Bodine |
| 2014/0143564 A1 | 5/2014 | Tannenbaum et al. |
| 2014/0188968 A1 | 7/2014 | Kaul et al. |
| 2014/0215189 A1 | 7/2014 | Airaud et al. |
| 2014/0281409 A1 | 9/2014 | Abdallah et al. |
| 2014/0380024 A1 | 12/2014 | Spadini et al. |
| 2015/0007182 A1 | 1/2015 | Rossbach et al. |
| 2015/0026434 A1 | 1/2015 | Basant et al. |
| 2015/0033001 A1 | 1/2015 | Ivanov |
| 2015/0067305 A1 | 3/2015 | Olson et al. |
| 2015/0067368 A1 | 3/2015 | Henry et al. |
| 2015/0082011 A1 | 3/2015 | Mellinger et al. |
| 2015/0082075 A1 | 3/2015 | Denman et al. |
| 2015/0089162 A1 | 3/2015 | Ahsan et al. |
| 2015/0089186 A1 | 3/2015 | Kim et al. |
| 2015/0100757 A1 | 4/2015 | Burger et al. |
| 2015/0106596 A1 | 4/2015 | Vorbach et al. |
| 2015/0113184 A1 | 4/2015 | Stanford-Jason et al. |
| 2015/0188847 A1 | 7/2015 | Chopra et al. |
| 2015/0220345 A1 | 8/2015 | Corbal et al. |
| 2015/0261528 A1 | 9/2015 | Ho et al. |
| 2015/0268963 A1 | 9/2015 | Etsion et al. |
| 2015/0278097 A1 | 10/2015 | Kelm et al. |
| 2015/0317134 A1 | 11/2015 | Kim et al. |
| 2015/0378731 A1 | 12/2015 | Lai et al. |
| 2015/0379670 A1 | 12/2015 | Koker et al. |
| 2016/0077568 A1 | 3/2016 | Kandula et al. |
| 2016/0098279 A1 | 4/2016 | Glew |
| 2016/0098420 A1 | 4/2016 | Dickie et al. |
| 2016/0239265 A1 | 8/2016 | Duong et al. |
| 2016/0364364 A1 | 12/2016 | Fleischer et al. |
| 2016/0381431 A1 | 12/2016 | Patterson et al. |
| 2017/0013495 A1 | 1/2017 | Chae et al. |
| 2017/0031866 A1 | 2/2017 | Nowatzki et al. |
| 2017/0062075 A1 | 3/2017 | Barber et al. |
| 2017/0083313 A1 | 3/2017 | Sankaralingam et al. |
| 2017/0092371 A1 | 3/2017 | Harari |
| 2017/0116154 A1 | 4/2017 | Palmer et al. |
| 2017/0163543 A1 | 6/2017 | Wang et al. |
| 2017/0255414 A1 | 9/2017 | Gerhart et al. |
| 2017/0262383 A1 | 9/2017 | Lee et al. |
| 2017/0286169 A1 | 10/2017 | Ravindran et al. |
| 2017/0293766 A1 | 10/2017 | Schnjakin et al. |
| 2017/0315815 A1 | 11/2017 | Smith et al. |
| 2017/0315978 A1 | 11/2017 | Boucher et al. |
| 2017/0325124 A1 | 11/2017 | Mitra et al. |
| 2017/0371836 A1 | 12/2017 | Langhammer |
| 2018/0081806 A1 | 3/2018 | Kothinti Naresh et al. |
| 2018/0081834 A1 | 3/2018 | Wang et al. |
| 2018/0088647 A1 | 3/2018 | Suryanarayanan et al. |
| 2018/0095728 A1 | 4/2018 | Hasenplaugh et al. |
| 2018/0101502 A1 | 4/2018 | Nassif et al. |
| 2018/0113797 A1 | 4/2018 | Breslow et al. |

(56) References Cited

U.S. PATENT DOCUMENTS

| | | | |
|---|---|---|---|
| 2018/0188983 A1 | 7/2018 | Fleming et al. |
| 2018/0188997 A1 | 7/2018 | Fleming et al. |
| 2018/0189063 A1 | 7/2018 | Fleming et al. |
| 2018/0189231 A1 | 7/2018 | Fleming et al. |
| 2018/0189239 A1 | 7/2018 | Nurvitadhi et al. |
| 2018/0189675 A1 | 7/2018 | Nurvitadhi et al. |
| 2018/0218767 A1 | 8/2018 | Wolff |
| 2018/0248994 A1 | 8/2018 | Lee et al. |
| 2018/0285385 A1 | 10/2018 | West et al. |
| 2018/0293162 A1 | 10/2018 | Tsai et al. |
| 2018/0300181 A1 | 10/2018 | Hetzel et al. |
| 2018/0316760 A1 | 11/2018 | Chernin et al. |
| 2018/0332342 A1 | 11/2018 | Wu et al. |
| 2018/0365181 A1 | 12/2018 | Cottam et al. |
| 2018/0373509 A1 | 12/2018 | Zhang et al. |
| 2019/0004878 A1 | 1/2019 | Adler et al. |
| 2019/0004945 A1 | 1/2019 | Fleming et al. |
| 2019/0004955 A1 | 1/2019 | Adler et al. |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |
| 2019/0026237 A1 | 1/2019 | Bannon et al. |
| 2019/0042217 A1 | 2/2019 | Glossop et al. |
| 2019/0042218 A1 | 2/2019 | Zhang |
| 2019/0042513 A1 | 2/2019 | Fleming et al. |
| 2019/0089354 A1 | 3/2019 | Venugopal et al. |
| 2019/0095369 A1 | 3/2019 | Fleming et al. |
| 2019/0095383 A1 | 3/2019 | Fleming et al. |
| 2019/0101952 A1 | 4/2019 | Diamond et al. |
| 2019/0102179 A1 | 4/2019 | Fleming et al. |
| 2019/0102338 A1 | 4/2019 | Tang et al. |
| 2019/0129720 A1 | 5/2019 | Ivanov |
| 2019/0205263 A1 | 7/2019 | Fleming et al. |
| 2019/0205269 A1 | 7/2019 | Fleming, Jr. et al. |
| 2019/0205284 A1 | 7/2019 | Fleming et al. |
| 2019/0303153 A1 | 10/2019 | Halpern et al. |
| 2019/0303168 A1 | 10/2019 | Fleming et al. |
| 2019/0303263 A1 | 10/2019 | Fleming et al. |
| 2019/0303297 A1 | 10/2019 | Fleming et al. |
| 2019/0303312 A1 | 10/2019 | Ahsan et al. |
| 2019/0377688 A1 | 12/2019 | Basu et al. |

FOREIGN PATENT DOCUMENTS

| | | | |
|---|---|---|---|
| EP | 2660716 A1 | 11/2013 |
| EP | 2854026 A1 | 4/2015 |
| RU | 2374684 C1 | 11/2009 |
| WO | 89/01203 A1 | 2/1989 |
| WO | 2003/100602 A2 | 12/2003 |
| WO | 2007/031696 A1 | 3/2007 |
| WO | 2014/035449 A1 | 3/2014 |
| WO | 2015/044696 A2 | 4/2015 |
| WO | 20151196343 A1 | 12/2015 |

OTHER PUBLICATIONS

Non-Final office action from U.S. Appl. No. 16/236,423, dated Aug. 21, 2019, 75 pages.
Notice of Allowance from U.S. Appl. No. 15/396,395, dated Aug. 7, 2019, 12 pages.
Notice of Allowance from U.S. Appl. No. 15/640,535, dated Aug. 21, 2019, 13 pages.
Notice of Allowance from U.S. Appl. No. 15/640,541, dated Aug. 13, 2019, 19 pages.
Notice of Allowance from U.S. Appl. No. 15/640,543, dated Jul. 29, 2019, 43 pages.
Notice of Allowance from U.S. Appl. No. 15/719,285, dated Jul. 23, 2019, 26 pages.
Corrected Notice of Allowance from U.S. Appl. No. 15/855,964, dated Jun. 25, 2019, 7 pages.
Corrected Notice of Allowance from U.S. Appl. No. 15/640,534, dated Jul. 2, 2019, 12 pages.
International Search Report and Written Opinion for Application No. PCT/US2019/020243, dated Jun. 19, 2019, 11 pages.
International Search Report and Written Opinion for Application No. PCT/US2019/020270, dated Jun. 14, 2019, 11 pages.
International Search Report and Written Opinion for Application No. PCT/US2019/019965, dated Jun. 13, 2019, 9 pages.
Notice of Allowance from U.S. Appl. No. 15/640,535, dated Jun. 21, 2019, 8 pages.
Notice of Allowance from U.S. Appl. No. 15/396,049, dated Jul. 2, 2019, 70 pages.
Notice of Allowance from U.S. Appl. No. 15/640,538, dated Jul. 3, 2019, 76 pages.
Notice of Allowance from U.S. Appl. No. 15/640,540, dated Jul. 1, 2019, 36 pages.
Advisory Action from U.S. Appl. No. 14/037,468, dated Aug. 11, 2017, 3 pages.
Corrected Notice of Allowance from U.S. Appl. No. 14/037,468, dated Apr. 1, 2019, 10 pages.
Corrected Notice of Allowance from U.S. Appl. No. 14/037,468, dated May 29, 2019, 12 pages.
Corrected Notice of Allowance from U.S. Appl. No. 15/396,395, dated Jun. 7, 2019, 8 pages.
Corrected Notice of Allowance from U.S. Appl. No. 15/721,802, dated Jun. 12, 2019, 11 pages.
Final Office Action from U.S. Appl. No. 14/037,468, dated Jun. 1, 2017, 18 pages.
Final Office Action from U.S. Appl. No. 14/037,468, dated Jun. 15, 2018, 7 pages.
Final Office Action from U.S. Appl. No. 14/037,468, dated May 16, 2016, 24 pages.
Final Office Action from U.S. Appl. No. 14/037,468, dated Oct. 5, 2016, 17 pages.
International Search Report and Written Opinion for Application No. PCT/US2019/020287, dated Jun. 12, 2019, 9 pages.
Non-Final Office Action from U.S. Appl. No. 14/037,468, dated Oct. 19, 2017, 19 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Notice of Allowance from U.S. Appl. No. 15/640,534, dated May 31, 2019, 9 pages.
Notice of Allowance from U.S. Appl. No. 14/037,468, dated Aug. 28, 2018, 9 pages.
Notice of Allowance from U.S. Appl. No. 14/037,468, dated Mar. 7, 2019, 51 pages.
Notice of Allowance from U.S. Appl. No. 15/640,533, dated May 22, 2019, 19 pages.
Notice of Allowance from U.S. Appl. No. 15/640,535, dated May 24, 2019, 19 pages.
Notice of Allowance from U.S. Appl. No. 15/721,809, dated Jun. 6, 2019, 32 pages.
Notice of Allowance from U.S. Appl. No. 15/859,454, dated Jun. 7, 2019, 55 pages.
Notice of Allowance from U.S. Appl. No. 16/024,801, dated Jun. 5, 2019, 64 pages.
Abandonment from U.S. Appl. No. 15/640,544, Mar. 20, 2018, 2 pages.
Arvind., et al., "Executing a Program on the MIT Tagged-Token Dataflow Architecture", Mar. 1990, IEEE Transactions on Computers, vol. 39 (3), pp. 300-318.
Asanovic K, et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.
Ball T., "What's in a Region? or Computing Control Dependence Regions in Near-Linear Time for Reducible Control Flow," Dec. 1993, ACM Letters on Programming Languages and Systems, 2(1-4):1-16, 24 pages.
Benchmarking DNN Processors, Nov. 2016, 2 pages.
Bluespec, "Bluespec System Verilog Reference Guide," Jun. 16, 2010, Bluespec, Inc, 453 pages.

(56) References Cited

OTHER PUBLICATIONS

Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.
Burger D., et al., "Scaling to the End of Silicon with EDGE Architectures," Jul. 12, 2004, vol. 37 (7), pp. 44-55.
Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Carloni L. P., et al., "The Theory of Latency Insensitive Design," Sep. 2001, IEEE Transactions on Computer-Aided Design of Integrated Circuits and Systems, vol. 20 (9), 18 pages.
Chandy K. M., et al., "Parallel Program Design: A Foundation," Addison-Wesley Publishing Company, Aug. 1988, 552 pages.
Chen Y., et al., "Eyeriss v2: A Flexible and High-Performance Accelerator for Emerging Deep Neural Networks," Jul. 2018, 14 pages.
Chen Y., et al., "Eyeriss: A Spacial Architecture for Energy-Efficient Dataflow for Convolutional Neural Networks," International Symposium on Computer Architecture (ISCA), Jun. 2016, pp. 367-379.
Chen Y., et al., "Eyeriss: A Spacial Architecture for Energy-Efficient Dataflow for Convolutional Neural Networks," Jun. 2016, 53 pages.
Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.
Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss: An Energy-Efficient Reconfigurable Accelerator for Deep Convolutional Neural Networks," IEEE International Solid-State Circuits Conference, ISSCC, 2016, 9 pages.
Chen Y., et al., "Eyeriss: An Energy-Efficient Reconfigurable Accelerator for Deep Convolutional Neural Networks," IEEE Journal of Solid State Circuits (JSSC), ISSCC Special Issue, Jan. 2017, vol. 52 (1), pp. 127-138.
Chen Y., et al., "Understanding the Limitations of Existing Energy-Efficient Design Approaches for Deep Neural Networks", Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Chen Y.H., et al., "Eyeriss: An Energy-Efficient Reconfigurable Accelerator for Deep Convolutional Neural Networks," 2016 IEEE International Solid-State Circuits Conference (ISSCC), Jan. 2016, 12 pages.
Compton K., et al., "Reconfigurable Computing: A Survey of Systems and Software," ACM Computing Surveys, Jun. 2002, vol. 34 (2), pp. 171-210.
Cong J., et al., "Supporting Address Translation for Accelerator-Centric Architectures," Feb. 2017, IEEE International Symposium on High Performance Computer Architecture (HPCA), 12 pages.
Coral Collaboration: Oak Ridge, Argonne, Livermore, Benchmark codes, downloaded from https://asc.llnl.gov/CORAL-benchmarks/ on Nov. 16, 2018, 6 pages.
Corrected Notice of Allowance from U.S. Appl. No. 15/640,534, dated Apr. 26, 2019, 21 pages.
Corrected Notice of Allowance from U.S. Appl. No. 15/640,535, dated Feb. 13, 2019, 7 pages.
Corrected Notice of Allowance from U.S. Appl. No. 15/721,802, dated Dec. 18, 2018, 8 pages.
Dally W. J., et al., "Principles and Practices of Interconnection Networks," Morgan Kaufmann, 2003, 584 pages.
Davidson A., "The Intel(Registered) HyperFlex(Trademark) FPGA Architecture meets the Performance Requirements of Next-Generation Systems," White Paper, A New FPGA Architecture and Leading-Edge FinFET Process Technology Promise to Meet Next-Generation System Requirements, 6 pages.
Dennis J.B., et al., "A Preliminary Architecture for a Basic Data-Flow Processor," 1975, In Proceedings of the 2nd Annual Symposium on Computer Architecture, pp. 125-131.
Dijkstra E.W., "Guarded Commands, Nondeterminacy and Formal Derivation of Programs," Aug. 1975, Communications of the ACM, vol. 18 (8), pp. 453-457.
Eisenhardt S., et al., "Optimizing Partial Reconfiguration of Multi-Context Architectures," Dec. 2008, 2008 International Conference on Reconfigurable Computing and FPGAs, 6 pages.
Emer J., et al., "Asim: A Performance Model Framework", Feb. 2002, Computer, vol. 35 (2), pp. 68-76.
Emer J., et al., "Hardware Architectures for Deep Neural Networks at CICS/MTL Tutorial", Mar. 27, 2017, 258 pages.
Emer J., et al., "Hardware Architectures for Deep Neural Networks at ISCA Tutorial", Jun. 24, 2017, 290 pages.
Emer J., et al., "Hardware Architectures for Deep Neural Networks at MICR0-49 Tutorial," Oct. 16, 2016, 300 pages.
Emer J., et al., "Tutorial on Hardware Architectures for Deep Neural Networks", Nov. 2016, 8 pages.
Emer J.S., et al., "A Characterization of Processor Performance in the VAX-11/780," In Proceedings of the 11th Annual International Symposium on Computer Architecture, Jun. 1984, vol. 12 (3), pp. 274-283.
Extended European Search Report for Application No. 17207172.2, dated Oct. 1, 2018, 14 pages.
Extended European Search Report for Application No. 17210484.6, dated May 29, 2018, 8 pages.
Final Office Action from U.S. Appl. No. 13/994,582, dated Oct. 3, 2017, 11 pages.
Final Office Action from U.S. Appl. No. 15/396,038, dated Mar. 11, 2019, 36 pages.
Final Office Action from U.S. Appl. No. 15/396,049, dated Dec. 27, 2018, 38 pages.
Final Office Action from U.S. Appl. No. 15/396,402, dated May 17, 2019, 85 pages.
Final Office Action from U.S. Appl. No. 15/721,809, dated Dec. 26, 2018, 46 pages.
Final Office Action from U.S. Appl. No. 15/859,473, dated Feb. 26, 2019, 13 pages.
Fleming et al., U.S. Patent App. titled "Memory Ordering in Acceleration Hardware," 81 pages, filed Dec. 30, 2016, U.S. Appl. No. 15/396,038.
Fleming et al., U.S. Patent App. titled "Runtime Address Disambiguation in Acceleration Hardware," filed Dec. 30, 2016, 97 pages., U.S. Appl. No. 15/396,049.
Fleming K., et al., "Leveraging Latency-Insensitivity to Ease Multiple FPGA Design", In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Achieve Scalable Reconfigurable Computation," Feb. 2013, 197 pages.
Notice of Allowance from U.S. Appl. No. 15/396,402, dated Sep. 16, 2019, 15 pages.
Notice of Allowance from U.S. Appl. No. 15/640,533, dated Sep. 12, 2019, 16 pages.
Notice of Allowance from U.S. Appl. No. 15/721,809, dated Sep. 5, 2019, 8 pages.
Notice of Allowance from U.S. Appl. No. 15/859,454, dated Sep. 12, 2019, 8 pages.
Notice of Allowance from U.S. Appl. No. 15/944,761, dated Sep. 12, 2019, 75 pages.
Notice of Allowance from U.S. Appl. No. 16/024,801, dated Sep. 12, 2019, 10 pages.
Notice of Allowance from U.S. Appl. No. 15/640,538, dated Sep. 20, 2019, 8 pages.
Non-Final Office Action from U.S. Appl. No. 15/640,542, dated Apr. 2, 2019, 59 pages.
Non-Final Office Action from U.S. Appl. No. 15/640,543, dated Jan. 2, 2019, 46 pages.

(56) References Cited

OTHER PUBLICATIONS

Non-Final Office Action from U.S. Appl. No. 15/719,285, dated Feb. 25, 2019, 47 pages.
Non-Final Office Action from U.S. Appl. No. 15/721,809, dated Jun. 14, 2018, 12 pages.
Non-Final Office Action from U.S. Appl. No. 15/855,964, dated Dec. 13, 2018, 13 pages.
Non-Final Office Action from U.S. Appl. No. 15/859,473, dated Oct. 15, 2018, 10 pages.
Non-Final Office Action, U.S. Appl. No. 15/721,802, dated Mar. 8, 2018, 8 pages.
Non-Final Office Action, U.S. Appl. No. 15/721,816, dated Dec. 5, 2019, 20 pages.
Non-Final Office Action, U.S. Appl. No. 16/024,849, dated Nov. 29, 2019, 10 pages.
Non-Final Office Action, U.S. Appl. No. 16/024,854, dated Jan. 13, 2020, 10 pages.
Non-Final Office Action, U.S. Appl. No. 16/236,423, dated Aug. 21, 2019, 75 pages.
Non-Final Office Action, U.S. Appl. No. 15/944,546, dated Nov. 25, 2019, 22 pages.
Notice of Allowance from U.S. Appl. No. 13/994,582, dated Aug. 7, 2018, 8 pages.
Notice of Allowance from U.S. Appl. No. 15/283,295, dated Apr. 10, 2019, 49 pages.
Notice of Allowance from U.S. Appl. No. 15/283,295, dated Jan. 3, 2019, 7 pages.
Notice of Allowance from U.S. Appl. No. 15/396,395, dated Dec. 28, 2018, 36 pages.
Notice of Allowance from U.S. Appl. No. 15/396,395, dated May 15, 2019, 23 pages.
Notice of Allowance from U.S. Appl. No. 15/640,533, dated Feb. 14, 2019, 43 pages.
Notice of Allowance from U.S. Appl. No. 15/640,533, dated Oct. 10, 2018, 8 pages.
Notice of Allowance from U.S. Appl. No. 15/640,534, dated Apr. 2, 2019, 9 pages.
Notice of Allowance from U.S. Appl. No. 15/640,534, dated Jan. 4, 2019, 37 pages.
Notice of Allowance from U.S. Appl. No. 15/640,534, dated Sep. 12, 2018, 7 pages.
Notice of Allowance from U.S. Appl. No. 15/640,535, dated Feb. 6, 2019, 38 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 15/640,538, dated Sep. 5, 2019, 8 pages.
Notice of Allowance from U.S. Appl. No. 15/640,540, dated Mar. 14, 2019, 39 pages.
Notice of Allowance from U.S. Appl. No. 15/719,281, dated Jan. 24, 2019, 36 pages.
Notice of Allowance from U.S. Appl. No. 15/721,802, dated Jul. 31, 2018, 6 pages.
Notice of Allowance from U.S. Appl. No. 15/721,802, dated Nov. 30, 2018, 30 pages.
Notice of Allowance from U.S. Appl. No. 15/855,964, dated Apr. 24, 2019, 15 pages.
Notice of Allowance from U.S. Appl. No. 15/859,466, dated May 17, 2019, 56 pages.
Notice of Allowance received for U.S. Appl. No. 15/859,473, dated Sep. 24, 2019, 6 pages.
Notice of Allowance, U.S. Appl. No. 15/396,038, dated Dec. 10, 2019, 2 pages.
Notice of Allowance, U.S. Appl. No. 15/396,038, dated Oct. 2, 2019, 9 pages.
Notice of Allowance, U.S. Appl. No. 15/396,049, dated Oct. 16, 2019, 2 pages.
Notice of Allowance, U.S. Appl. No. 15/396,402, dated Jan. 8, 2020, 2 pages.
Notice of Allowance, U.S. Appl. No. 15/640,535, dated Aug. 21, 2019, 13 pages.
Notice of Allowance, U.S. Appl. No. 15/944,761, dated Jan. 8, 2020, 2 pages.
Notice of Allowance, U.S. Appl. No. 15/944,761, dated Nov. 1, 2019, 2 pages.
Notice of Allowance, U.S. Appl. No. 16/024,801, dated Sep. 12, 2019, 10 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE Micro, vol. 34 (3), Mar. 10, 2014, pp. 120-137.
Parashar et al., "LEAP: A Virtual Platform Architecture for FPGAs," Intel Corporation, 6 pages, 2010.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Schauser et al., "Compiler-Controlled Multithreading for Lenient Parallel Languages", Aug. 1991, pp. 1-21.
Schmit H., et al., "PipeRench: A Virtualized Programmable Datapath in 0.18 Micron Technology," 2002, IEEE 2002 Custom Integrated Circuits Conference, pp. 63-66.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference , Jan. 2011, 6 pages.
Smith A., et al., "Compiling for EDGE Architectures," Appears in the Proceedings of the 4th International Symposium Jn code Generation and Optimization, 2006, 11 pages.
Smith A., et al., "Dataflow Predication," 2006, In Proceedings of the 39th Annual IEEE/ACM International Symposium on Microarchitecture, 12 pages.
Suleiman A., et al., "Towards Closing the Energy Gap Between HOG and CNN Features for Embedded Vision," IEEE International Symposium of Circuits and Systems (ISCAS), May 2017, 4 pages.
Swanson S., et al., "The WaveScalar Architecture," May 2007, ACM Transactions on Computer Systems, vol. 25 (2), Article No. 4, 35 pages.
Sze V., "Designing Efficient Deep Learning Systems," in Mountain View, CA, Mar. 27-28, 2019, retrieved from https://professional.mit.edu/programs/short-programs/designing-efficienl-deep-learning-systems-OC on Feb. 14, 2019, 2 pages.
Sze V., et al., "Efficient Processing of Deep Neural Networks: A Tutorial and Survey," Mar. 2017, 32 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities,"IEEE Custom Integrated Circuits Conference (CICC), Oct. 2017, 9 pages.
Taylor M.B., et al., "The Raw Microprocessor: A Computational Fabric for Sollware Circuits and General-Purpose Programs," 2002, IEEE Micro, vol. 22 (2), pp. 25-35.
The LLVM Compiler Infrastructure, retrieved from http://www.llvm.org/, on May 1, 2018, maintained by the llvm-admin team, 4 pages.
Truong D.N., et al., "A 167-Processor Computational Platform in 65 nm CMOS," IEEE Journal of Solid-State Circuits, Apr. 2009, vol. 44 (4), pp. 1130-1144.
Tutorial at MICRO-50, The 5oth Annual IEEE/ACM International Symposium on Microarchitecture, Oct. 14-18, 2017, retrieved from https://www.microarch.org/micro50/ on Feb. 14, 2019, 3 pages.

(56) References Cited

OTHER PUBLICATIONS

Tutorial on Hardware Architectures for Deep Neural Networks at ISCA 2017, The 44th International Symposium on Computer Architecture, Jun. 24-28, 2017, retrieved from http://isca17.ece.utoronto.ca/doku.php on Feb. 14, 2019, 2 pages.
Van De Geijn R.A., et al., "SUMMA: Scalable Universal Matrix Multiplication Algorithm," 1997, 19 pages.
Vijayaraghavan M., et al., "Bounded Dataflow Networks and Latency-Insensitive Circuits," In Proceedings of the 7th IEEE/ACM International Conference on Formal Methods and Models for Codesign (MEMOCODE'09), Jul. 13-15, 2009, pp. 171-180.
Wikipedia, "TRIPS Architecture," retrieved from https://en.wikipedia.org/wiki/TRIPS_architecture on Oct. 14, 2018, 4 pages.
Wikipedia, The Free Encyclopedia, "Priority encoder," https://en.wikipedia.org/w/index.php?Title=Priority_encoder&oldid=746908667, revised Oct. 30, 2016, 2 pages.
Wikipedia, The Free Encyclopedia, "Truth table," Logical Implication Table, https://enwikipedia.org/wiki/Truth_table#Logical_implication, revised Nov. 18, 2016, 9 pages.
Williston, Roving Reporter, Intel® Embedded Alliance, "Roving Reporter: FPGA + Intel® Atom TM = Configurable Processor," Dec. 2010, 5 pages.
Yang T., et al., "A Method to Estimate the Energy Consumption of Deep Neural Networks," Asilomar Conference on Signals, Systems and Computers, Oct. 2017, 5 pages.
Yang T., et al., "Deep Neural Network Energy Estimation Tool", IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al., "NetAdapt: Platform-Aware Neural Network Adaptation for Mobile Applications," European Conference on Computer Vision (ECCV), Version 2, Sep. 28, 2018, 16 pages.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.
Yu Z., et al., "An Asynchronous Array of Simple Processors for DSP Applications," IEEE International Solid-State Circuits Conference, ISSCC'06, Feb. 8, 2006, 10 pages.
Full Day Tutorial Field at MICRO-49, Oct. 15-19, 2016, retrieved from https://www.microarch.org/micro49/ on Feb. 14, 2019, 2 pages.
Govindaraju et al.,"DySER: Unifying Functionality and Parallelism Specialization for Energy-Efficient Computing," Published by the IEEE Computer Society, Sep./Oct. 2012, pp. 38-51.
Govindaraju V., et al., "Dynamically Specialized Datapaths for Energy Efficient Computing," 2011, In Proceedings of the 17th International Conference on High Performance Computer Architecture, 12 pages.
Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.
Hans., et al., "EIE: Efficient Inference Engine on Compressed Deep Neural Network," ISCA, May 2016, 12 pages.

Hauser J. R. et al., "Garp: a MIPS processor with a Reconfigurable Coprocessor", Proceedings of the 5th Annual IEEE Symposium on Field-Programmable Custom Computing Machines, 1997, 10 pages.
Hoogerbrugge J., et al., "Transport-Triggering vs. Operation-Triggering", 1994, In Compiler Construction, Lecture Notes in Computer Science, vol. 786, Springer, pp. 435-449.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Ibrahim Eng., Walaa Abd El Aziz, "Binary Floating Point Fused Multiply Add Unit", Faculty of Engineering, Cairo University Giza, Egypt, 2012, 100 Pages.
Intel(Registered) Architecture, "Instruction Set Extensions and Future Features Programming Reference," 319433-034, May 2018, 145 pages.
Intel, "Intel(Registered) 64 and IA-32 Architectures Software Developer Manuals," Oct. 12, 2016, Updated—May 18, 2018, 19 pages.
International Preliminary Report on Patentability for Application No. PCT/RU2011/001049, dated Jul. 10, 2014, 6 pages.
International Preliminary Report on Patentability for Application No. PCT/US2017/050663, dated Apr. 11, 2019, 11 pages.
International Preliminary Report on Patentability for Application No. PCT/US2017/055849, dated Apr. 25, 2019, 6 pages.
International Search Report and Written Opinion for Application No. PCT/RU2011/001049, dated Sep. 20, 2012, 6 pages.
International Search Report and Written Opinion for Application No. PCT/US2017/055849, dated Dec. 26, 2017, 8 pages.
International Search Report and Written Opinion received for PCT Patent Application No. PCT/US2017/050663, dated Dec. 28, 2017, 14 pages.
International Search Report and Written Opinion received for PCT Patent Application No. PCT/US2019/034358, dated Sep. 18, 2019, 10 pages.
International Search Report and Written Opinion received for PCT Patent Application No. PCT/US2019/034400, dated Sep. 19, 2019, 11 pages.
International Search Report and Written Opinion received for PCT Patent Application No. PCT/US2019/034433, dated Sep. 20, 2019, 10 pages.
International Search Report and Written Opinion received for PCT Patent Application No. PCT/US2019/034441, dated Sep. 23, 2019, 10 pages.
Kalte H., et al., "Context Saving and Restoring for Multitasking in Reconfigurable Systems", International Conference on Field Programmable Logic and Applications, Aug. 2005, pp. 223-228.
Kim et al., "Energy-Efficient and High Performance CGRA-based Multi-Core Architecture," Journal of Semiconductor Technology and Science, vol. 14 (3), Jun. 2014, 16 pages.
King M., et al., "Automatic Generation of Hardware/Software Interfaces", Proceedings of the 17th International Conference on Architectural Support for Programming Languages and Operating Systems, ASPLOS'12, Mar. 2012, 12 pages.
Knuth D. E., et al., "Fast Pattern Matching in Strings," Jun. 1977, SIAM Journal of Computing, vol. 6(2), pp. 323-350.
Lee T., et al., "Hardware Context-Switch Methodology for Dynamically Partially Reconfigurable Systems," Journal of Information Science and Engineering, vol. 26, Jul. 2010, pp. 1289-1305.
Lewis D., et al., "The Stratix™ 10 Highly Pipelined FPGA Architecture," FPGA'16, ACM, Feb. 21-23, 2016, pp. 159-168.
Lis., etal., "Case Study: Computing Black-Scholes with Intel® Advanced Vector Extensions," Sep. 6, 2012, 20 pages.
Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Matsen F.A., et al., "The CMU warp processor," In Supercomputers: Algorithms, Architectures, and Scientific Computation, 1986, pp. 235-247.

(56) References Cited

OTHER PUBLICATIONS

Mccalpin J.D., "Memory Bandwidth and Machine Balance in Current High Performance Computers," IEEE Computer Society Technical Committee on Computer Architecture (TCCA) Newsletter, Dec. 1995, 7 pages.
Mccalpin J.D., "STREAM: Sustainable memory bandwidth in high performance computers," 2016, 4 pages.
Mei B. et al., "ADRES: An Architecture with Tightly Coupled VLIW Processor and Coarse-Grained Reconfigurable Matrix", 2003, In Proceedings of International Conference on Field-Programmable Logic and Applications, 10 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Mirsky E., at al., "MATRIX: A Reconfigurable Computing Architecture with Configurable Instruction Distribution and Deployable Resources," 1996, In Proceedings of the IEEE Symposium on FPGAs for Custom Computing Machines, pp. 157-166.
Natalie E. J., et al., "On-Chip Networks," Synthesis Lectures on Computer Architecture, Morgan and Claypool Publishers, 2009, 148 pages.
Non-Final Office Action from U.S. Appl. No. 13/994,582, dated Feb. 7, 2018, 12 pages.
Non-Final Office Action from U.S. Appl. No. 13/994,582, dated Mar. 23, 2017, 9 pages.
Non-Final Office Action from U.S. Appl. No. 15/283,295, dated Apr. 30, 2018, 18 pages.
Non-Final Office Action from U.S. Appl. No. 15/396,038, dated Oct. 5, 2018, 38 pages.
Non-Final Office Action from U.S. Appl. No. 15/396,049, dated Jun. 15, 2018, 33 pages.
Non-Final Office Action from U.S. Appl. No. 15/396,395, dated Jul. 20, 2018, 18 pages.
Non-Final Office Action from U.S. Appl. No. 15/396,402, dated Nov. 1, 2018, 22 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/640,540, dated Oct. 26, 2018, 8 pages.
Non-Final Office Action from U.S. Appl. No. 15/640,541, dated Apr. 12, 2019, 61 pages.
Corrected Notice of Allowability, U.S. Appl. No. 16/024,802, dated Oct. 1, 2020, 2 pages.
Final Office Action, U.S. Appl. No. 15/640,542, dated Aug. 24, 2020, 31 pages.
Final Office Action, U.S. App. No. 16/024,854, dated Jul. 22, 2020, 11 pages.
Non-Final Office Action, U.S. Appl. No. 16/458,032, dated Jul. 24, 2020, 9 pages.
Notice of Allowance, U.S. Appl. No. 15/941,888, dated Sep. 8, 2020, 9 pages.
Notice of Allowance, U.S. Appl. No. 16/024,802, dated Aug. 28, 2020, 11 pages.
Notice of Allowance, U.S. Appl. No. 16/370,928, dated Aug. 11, 2020, 9 pages.
Supplemental Notice of Allowability, U.S. Appl. No. 15/370,915, dated Sep. 23, 2020, 4 pages.
European Search Report and Search Opinion, EP App. No. 20157807.7, dated Aug. 25, 2020, 6 pages.
European Search Report and Search Opinion, EP App. No. 20164075.2, dated Sep. 14, 2020, 6 pages.

* cited by examiner

EXECUTING DISTRIBUTED MEMORY OPERATIONS USING PROCESSING ELEMENTS CONNECTED BY DISTRIBUTED CHANNELS

CROSS-REFERENCE TO RELATED APPLICATIONS

The present patent application is a continuation application claiming priority from U.S. patent application Ser. No. 14/037,468, filed Sep. 26, 2013, and titled: "Distributed Memory Operations", which is incorporated herein by reference in its entirety.

TECHNICAL FIELD

Embodiments described herein generally relate to computing systems and, more specifically, relate to a distributed load store operations in computing systems.

BACKGROUND

A computing system can include processing devices, such as microprocessors, central processing units (CPUs, such as x86 cores, etc.), graphic processing units (GPUs), and spatial processing units (SPUs), that share memory, such as a last level cache, on-chip memory, etc. The SPU can be reconfigurable and include multiple processing elements and a memory element. The processing elements are connected to each other and to the memory element through an interconnection network. Each processing element can execute basic operations and can process data that is either delivered from other processing elements or the memory element. An algorithm can be mapped onto the SPU by configuring each processing element to perform an operation, and data can flow in a pipelined manner across the processing elements and to memory.

The processing elements communicating to memory can vary depending on the algorithm being mapped onto the SPU, so that the number of processing elements communicating to memory can be high in one configuration and low in the next configuration. Moreover, the processing elements that are performing load operations and store operations can vary based on the algorithm, as well as the access patterns of those processing elements.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
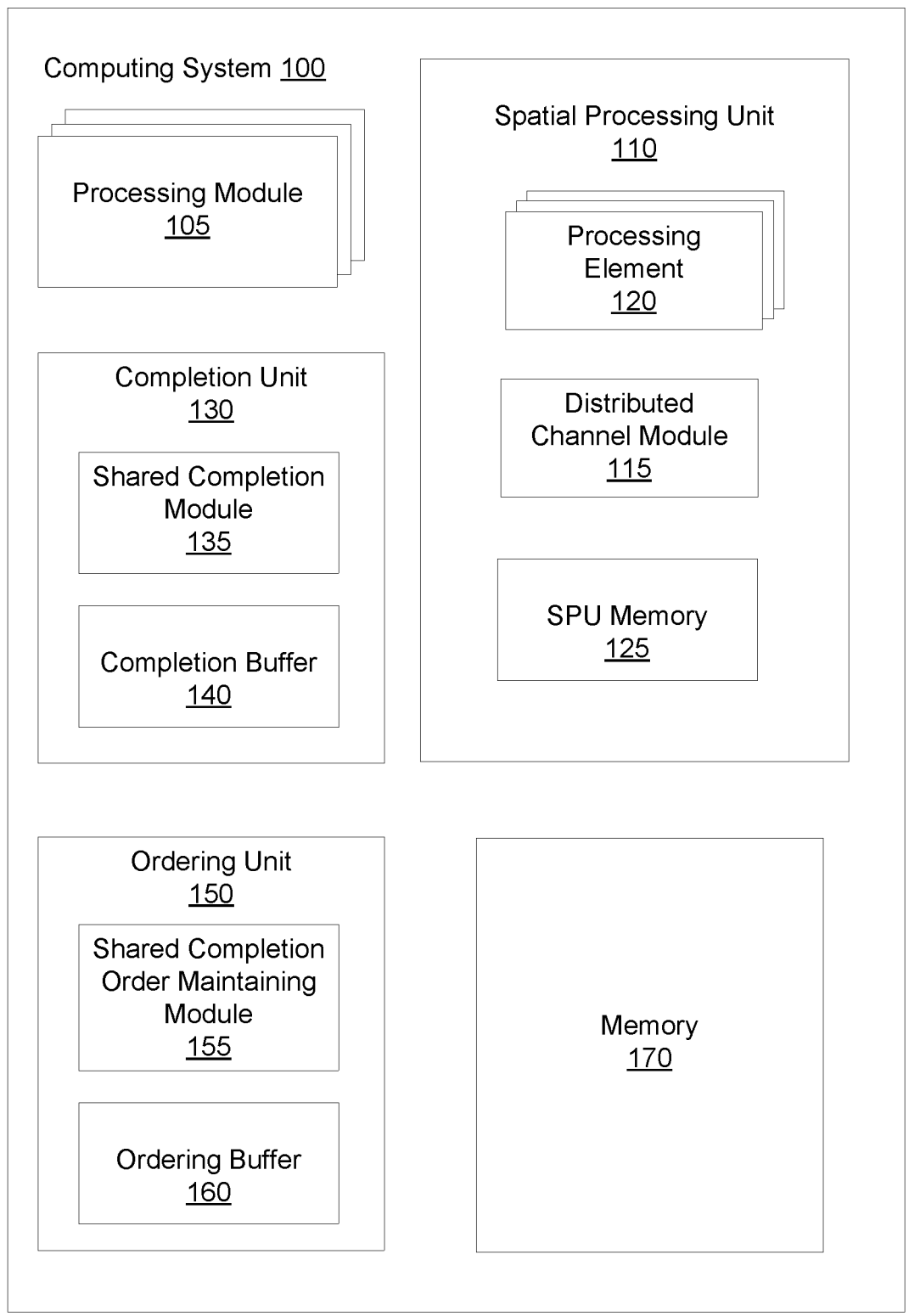
FIG. 1 is a block diagram of one embodiment of a computing system including a distributed channel module that implements distributed memory operations.

A spatial processing unit (SPU) can include multiple processing elements and a memory element. The processing elements are connected to each other and to the memory element through an interconnection network. Each processing element can have its own memory resource, such as a cache. However, each processing element having its own memory resource can require a lot of space and consume resources. Each processing element can execute basic operations and can process data that is either delivered from other processing elements or the memory element. An algorithm can be executed by, or mapped onto, the SPU by configuring each processing element to perform an operation, and data can flow in a pipelined manner across the processing elements through channels that connect the processing elements and through channels that connect a processing element to memory. A different algorithm can be mapped onto the SPU by reconfiguring each processing element based on the different algorithm.

A processing element in the SPU can communicate with memory associated with the SPU via a memory port. However, based on the algorithm mapped onto the SPU, different processing elements in the SPU may communicate with memory depending on the algorithm. Allocating a memory port to each processing element can be inefficient because the number of processing elements in the SPU may be larger than the number of processing elements using the memory ports, thus wasting the unused memory ports.

Moreover, in a computing system, memory requests may complete in a different order than the order in which the memory requests were issued. If the computing system requests that memory requests be delivered in program order, the computing system can use a completion buffer to hold the memory requests that are not ready to be returned. For a computing system with multiple processing elements, such as a computing system with an SPU or a computing system with multiple cores, each processing element that makes memory requests may need a separate completion buffer. However, this can be inefficient because the processing elements making memory requests vary based on the algorithm being executed by the processing elements, thereby resulting in unused completion buffers. Moreover, if a burst of traffic occurs for a processing element, the completion buffers may not be large enough to allocate the memory requests required by the burst of traffic.

In addition, the order of the memory requests from each processing element in the computing system can be maintained, such that data written by a store request can be used by a later load to the same address. A store buffer and a miss address file (MAF) can be used to maintain the order of the memory requests and keep track of outstanding misses to an address. The store buffer can maintain a program order between loads and stores to memory. The MAF can maintain outstanding cache misses, with a load miss to an address causing a MAF entry to be allocated and each subsequent load miss to the address will be combined (e.g., coalesced) in the MAF, such that only a single load miss is outstanding for the address. For each load request, two searches can be performed: 1) a search (e.g., Content-Addressable Memory, or CAM, search) of the store buffer to determine if data for the load exists for the load, and 2) a search of the MAF to coalesce a miss to the address if the address already exists in the MAF. However, the use of the store buffer and multiple searches for each load request incur area, complexity, and power overheads that are multiplied by the use of multiple processing elements.

Embodiments of the disclosure provide for distributed memory operations using distributed channels. A distributed channel may or may not be associated with memory operations, such as load operations or store operations. In one embodiment, a method of the disclosure includes obtaining distributed channel information for an algorithm to be executed by a group of spatially distributed processing elements. The group of spatially distributed processing elements can be connected to a shared memory controller. For each distributed channel in the distributed channel information, the method further associates one or more of the group of spatially distributed processing elements with the distributed channel based on the algorithm. By associating the spatially distributed processing elements to a distributed channel, the functionality of the processing element can vary depending on the algorithm mapped onto the SPU. Moreover, memory ports can be allocated only to the distributed channels that require memory accesses, rather than individual spatially distributed processing elements, thereby reducing the number of unused memory ports.

Embodiments of the disclosure further provide for a completion buffer that is shared by multiple processing elements. In one embodiment, a method of the present disclosure maintains a shared completion buffer by obtaining a request for the completion buffer and determining if only a few slots remain in the completion buffer (e.g., if the number of remaining slots is below a predefined threshold). If more than a few slots remain in the completion buffer, the method of the disclosure can save the request to the completion buffer. If a few slots remain in the completion buffer, the method of the disclosure can save the request in the completion buffer if the request is a load request from a channel that is guaranteed to make forward progress. By sharing the completion buffer across multiple processing elements, the computing system can be more efficient because the completion buffer will be well utilized. Moreover, by determining if the channel associated with a request into the completion buffer will make progress while the request is in the completion buffer, deadlock of the computing system can be avoided and memory requests required by a burst of traffic can be properly allocated in the completion buffer.

Embodiments of the disclosure further provide for an ordering buffer that maintains an order for outstanding memory requests. The single ordering buffer can be used instead of the store buffer and miss address file (MAF). In one embodiment, a method of the disclosure maintains an order in an ordering buffer by allocating an entry for a request to an address. The method of the disclosure then determines if another entry (associated with another request) in the ordering buffer exists for the same address, thereby requiring an order to be maintained. Upon determining that an order needs to be maintained, the method of the disclosure updates the ordering buffer to include an order that the most current request was received after the previous request to the address. By maintaining an order of both load and store requests to the same address in the same ordering buffer, only a single search of the ordering buffer is required for an outstanding cache miss. Moreover, the ordering buffer can be used to easily service requests to an outstanding address in order once data for the outstanding address returns from memory.

FIG. 1 is a block diagram of a computing system 100 that implements distributed memory operations. Some examples of computing system 100 may include, but are not limited to computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine.

Computing system 100 may include, for example, one or more processing modules 105 to handle operations for computing system 100, a spatial processing unit 110, a completion unit 130, an ordering unit 150, and a memory system 170. Each processing module 105 may comprise one or more processing devices (also known as processors) situated in separate component, or alternatively, one or more processing cores embodied in a single integrated circuit (IC) arranged, for example, in a System-on-a-Chip (SOC) configuration. In some embodiments, the processing device is a general purpose processing device. For example, each processing module 105 includes processing devices of the type commonly used as a central processing unit (CPU). In other embodiments, the processing device may be a special-purpose processing device. Examples of special purpose processors include, but are not limited to, co-processing devices, graphics processing devices, communications processing devices, network processing devices, cryptographic processing devices, embedded processing devices, digital signal processing devices (DSPs), etc. Each processing module 105 can be connected to a socket. In some embodiments, if there are multiple processing modules 105, the processing modules 105 can be connected to the same socket or different sockets.

Spatial processing unit 110 may execute instructions, such as an algorithm, and make requests to memory based on the instructions. Instructions may include program code to cause spatial processing unit 110 to perform activities such as, but not limited to, reading data, writing data, processing data, formulating data, converting data, transforming data, etc. Information, including instructions, data, etc. (not shown) may be stored in memory system 170.

Completion unit 130 may execute instructions. Instructions may include program code to cause completion unit 130 to perform activities such as, but not limited to, reading data, writing data, processing data, formulating data, converting data, transforming data, etc. Information, including instructions, data, etc. (not shown) may be stored in memory system 170.

Ordering unit 150 may execute instructions. Instructions may include program code to cause ordering unit 150 to perform activities such as, but not limited to, reading data, writing data, processing data, formulating data, converting data, transforming data, etc. Information, including instructions, data, etc. (not shown) may be stored in memory system 170.

Memory system 170 may include random access memory (RAM) or read-only memory (ROM) in a fixed or removable format. RAM may include memory to hold information during the operation of the computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. Other fixed and/or removable memory may include magnetic memories such as floppy disks, hard drives, etc., electronic memories such as solid state Flash memory (e.g., eMMC, etc.), removable memory cards or sticks (E.g., USB, micro-SD, etc.), optical memories such as compact disc-based ROM (CD-ROM), holographic, etc.

Although each of processing modules 105, spatial processing unit 110, completion unit 130, ordering unit 150, and memory system 170 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

An embodiment of spatial processing unit 110 may include a distributed channel module 115, one or more processing elements 120, and an SPU memory 125. Each processing element 120 can perform or execute a basic operation, such as an arithmetic operation, a memory operation, etc. A processing element 120 can be a spatially distributed processing element that can communicate with another processing element 120 using a distributed channel (not shown). A processing element 120 can communicate with SPU memory 125 using a distributed channel. SPU memory 125 can be a shared memory and can include a memory controller to manage the flow of data (requests) going to and coming from SPU memory 125.

SPU memory 125 may include random access memory (RAM) or read-only memory (ROM) in a fixed or removable format. RAM may include memory to hold information during the operation of the computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. Other fixed and/or removable memory may include magnetic memories such as floppy disks, hard drives, etc., electronic memories such as solid state Flash memory (e.g., eMMC, etc.), removable memory cards or sticks (E.g., USB, micro-SD, etc.), optical memories such as compact disc-based ROM (CD-ROM), holographic, etc. SPU memory 125 can include distributed channel information defining a number of distributed channels that will be used to execute an algorithm and a type of each distributed channel that will be used to execute the algorithm.

An embodiment of completion unit 130 may include a shared completion module 135 and a completion buffer 140. The completion buffer 140 may include random access memory (RAM) or read-only memory (ROM) in a fixed or removable format. RAM may include memory to hold information during the operation of the computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. Other fixed and/or removable memory may include magnetic memories such as floppy disks, hard drives, etc., electronic memories such as solid state Flash memory (e.g., eMMC, etc.), removable memory cards or sticks (E.g., USB, micro-SD, etc.), optical memories such as compact disc-based ROM (CD-ROM), holographic, etc. The completion buffer 140 can include entries associated with memory requests awaiting completion from multiple processing devices, such as from processing modules 105 or processing elements 120.

An embodiment of ordering unit 150 may include a shared completion order maintaining module 155 and an ordering buffer 160. The ordering buffer 160 may include random access memory (RAM) or read-only memory (ROM) in a fixed or removable format. RAM may include memory to hold information during the operation of the computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. Other fixed and/or removable memory may include magnetic memories such as floppy disks, hard drives, etc., electronic memories such as solid state Flash memory (e.g., eMMC, etc.), removable memory cards or sticks (E.g., USB, micro-SD, etc.), optical memories such as compact disc-based ROM (CD-ROM), holographic, etc. The ordering buffer 160 can include entries associated with memory requests requiring an order to be maintained from multiple processing devices, such as from processing modules 105 or processing elements 120.

During operation of the computing system 100, the spatial processing unit 110 can receive an algorithm to execute. The distributed channel module 115 can obtain distributed channel information for the algorithm from SPU memory 125, from an operating system (not shown) of the computing system 100, from an application (not shown) running the algorithm, etc. The distributed channel information can include a number of distributed channels and a type of each distributed channel to be used to execute the algorithm. The distributed channel information can be determined by an operating system, by a system administrator, etc.

The distributed channel module 115 can determined whether a distributed channel in the distributed channel information is associated with a memory operation based on the type of the distributed channel. If the distributed channel is associated with a memory operation, the distributed channel module 115 can allocate a memory port for the distributed channel to allow the distributed channel to access (e.g., request data, receive data, etc.) from SPU memory 125. If the distributed channel is not associated with a memory operation, the distributed channel module 115 may not allocate a memory port for the distributed channel because the distributed channel does not need to access SPU memory 125.

The distributed channel module 115 can associate one or more of the processing elements 120 with the distributed channel based on a configuration of the processing elements 120. For example, if a channel is a load request channel, the distributed channel module 115 will associate a processing element 120 that can perform a load request or a portion of a load request (e.g., send load request, receive data based on load request, etc.) with the load request channel.

The distributed channel module 115 can associate request information with the distributed channel upon associating one or more processing elements 120 with the distributed channel. The request information can indicate how a memory element associated with the channel should treat the data once it arrives from the distributed channel without requiring the request information to be sent with the request from the distributed channel.

During operation of the computing system 100, the completion unit 130 can receive a memory request. The shared completion module 135 can obtain the memory request and determine if a predetermined number of slots remain in the completion buffer 140. If more than a predetermined number of slots remain in the completion buffer 140, the shared completion module 135 can save the request to the completion buffer 140. If a predetermined number of slots remain in the completion buffer 140, the completion unit 130 can save the request in the completion buffer 140 if the request is a load request from a distributed channel that is guaranteed to make forward progress. If a predetermined number of slots remain in the completion buffer 140, the completion unit 130 may not save the request in the completion buffer 140 if the request is a store request or if the request is a load request from a distributed channel that is not guaranteed to make forward progress.

During operation of the computing system 100, the ordering unit 150 receives a memory request associated with an address. The order maintaining module 155 can allocate an entry for the memory request. The order maintaining module 155 determines if an entry in the ordering buffer 160 exists to the same address, thereby requiring an order to be maintained. Upon determining that an order needs to be maintained, the order maintaining module 155 updates the ordering buffer 160 to include an order that the most current request was received after the previous request to the address.

Figure 2:
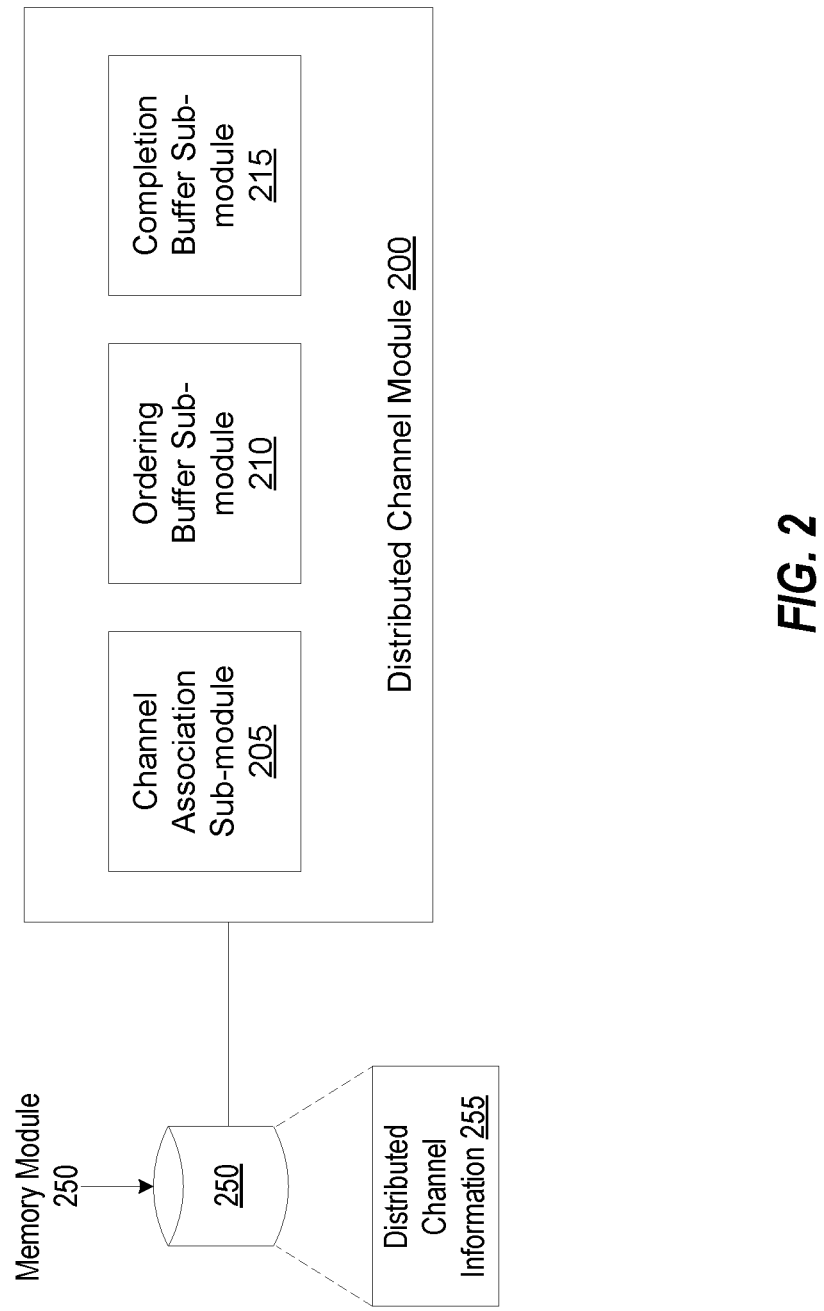
FIG. 2 is a block diagram illustrating an distributed channel module to implement the distributed memory operations according to an embodiment of the disclosure.

FIG. 2 illustrates a distributed channel module 200 to implement distributed memory operations, in accordance with one embodiment of the present disclosure. In one embodiment, the distributed channel module 200 is the same as the distributed channel module 115 described above with respect to FIG. 1. The distributed channel module 200 may include a memory operation determination sub-module 205, a memory port allocation sub-module 210, and a processing element association sub-module 215. More or less components may be included in the distributed channel module 200 without loss of generality.

Memory operation determination sub-module 205 determines whether a distributed channel is associated with a memory operation. Memory operation determination sub-module can obtain information associated with the distributed channel from memory, such as distributed channel information 255 in memory module 250. The distributed channel information 255 can be based on an algorithm to be executed by a spatial processing unit (not shown). The distributed channel information 255 can include a number of distributed channels that will be used to execute the algorithm and a type of each distributed channel that will be used to execute the algorithm. The determination of the number of distributed channels and the type of each distributed channel used to execute the algorithm can be made by an operating system, by a system administrator, etc. Memory operation determination sub-module 205 can determine whether a distributed channel is associated with a memory operation by comparing the type of the distributed channel to channel types that are associated with memory operations, such as a load channel, a store data channel, a store address channel, etc.

Memory port allocation sub-module 210 can allocate a memory port for a distributed channel, such as a distributed channel included in distributed channel information 255 in memory module 250. The memory port can be an access port between a spatially distributed processing element in an SPU (not shown) and memory associated with the SPU (not shown).

Processing element association sub-module 215 associates one or more spatially distributed processing elements (not shown) with the distributed channel based on a type of the distributed channel and the operation performed by each spatially distributed processing element. The spatially distributed processing elements (not shown) can connect to a shared memory controller (not shown). In some optional embodiments, processing element association sub-module 215 associates request information with the distributed channel upon associating one or more processing elements with the distributed channel. The request information can indicate how a memory element associated with the channel should treat the data once it arrives from the distributed channel without requiring the request information to be sent with the request from the distributed channel. The request information can include whether requests associated with the distributed channel are cacheable, not cacheable, coherent, not coherent, end of data, atomic store, etc.

Figure 3A:
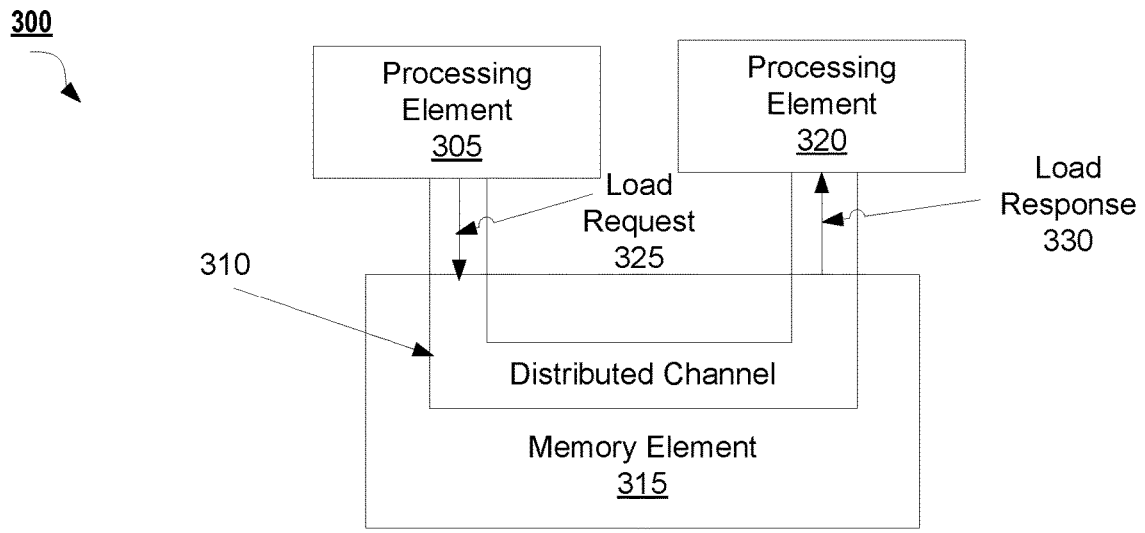
FIG. 3A is an exemplary block diagram of a distributed load memory operation according to an embodiment of the disclosure.

FIG. 3A is a block diagram of a distributed load memory operation 300 according to an embodiment of the disclosure. For example, the distributed load memory operation 300 can be performed by an algorithm that requires a load memory operation to memory. The algorithm can be mapped to an SPU and a distributed channel in the SPU can be configured to perform the load memory operation. For example, the distributed channel 310 can be configured to perform the distributed load operation, such as setting a type of the distributed channel 310 to be load request and response. Because the distributed channel 310 is associated with a load memory operation, a memory port of memory, such as a memory port associated with memory element 315, can be associated with the distributed channel 310. Processing element 305 and processing element 320 can be associated with the distributed channel 310 to perform the load memory operation. For better pipelining and efficiency, the load memory operation is distributed to multiple processing elements, with the load request 325 generated by processing element 305 and the load response 330 received by processing element 320. The processing element 305 can generate the load request 325 and send the load request 325 via the distributed channel 310 to the memory element 315. The memory element 315 obtains the data for the load request 325 and generates a load response 330. Processing element 320 can receive the load response 330 from memory element 315 via the distributed channel 310 to complete the load memory operation.

Figure 3B:
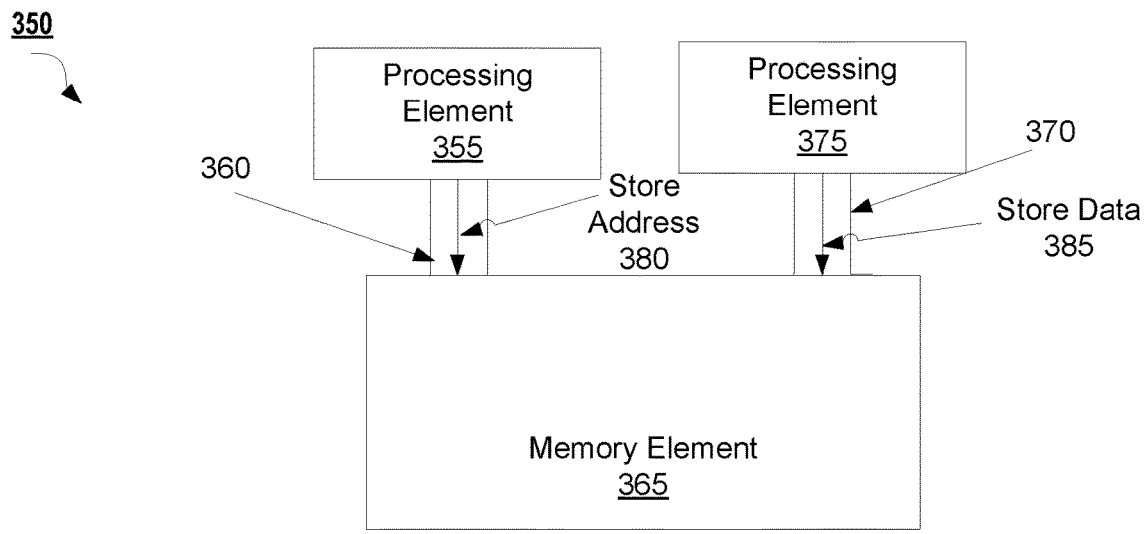
FIG. 3B is an exemplary block diagram of a distributed store memory operation according to an embodiment of the disclosure.

FIG. 3B is a block diagram of a distributed store memory operation 350 according to an embodiment of the disclosure. For example, the distributed store memory operation 350 can be performed by an algorithm that requires a store memory operation to memory. The algorithm can be mapped to an SPU and multiple distributed channels in the SPU can be configured to perform the store memory operation. For example, distributed channel 360 and distributed channel 370 can be configured to perform the distributed store operation, such as setting a type of the distributed channel 360 to be a store address channel and a type of the distributed channel 370 to be a store data channel. Because the distributed channel 360 is associated with a store memory operation, a memory port of memory, such as a memory port associated with memory element 365, can be associated with the distributed channel 360. Because the distributed channel 370 is associated with a store memory operation, another memory port of memory, such as another memory port associated with memory element 365, can be associated with the distributed channel 370. Processing element 355 can be associated with the distributed channel 360 and processing element 375 can be associated with the distributed channel 370 to perform the store memory operation. For better utilization of the processing elements and distributed computation, the store memory operation is distributed to multiple processing elements and multiple distributed channels. For example, the store address 380 is generated by the processing element 355 and provided to the memory element 365 via the distributed channel 360. The store data 385 is generated by the processing element 375 and provided to the memory element via the distributed channel 370. The memory element 365 can match the store address 380 and store data 385 coming across the channels 360 and 370 in order to complete the store memory operation.

Figure 4:
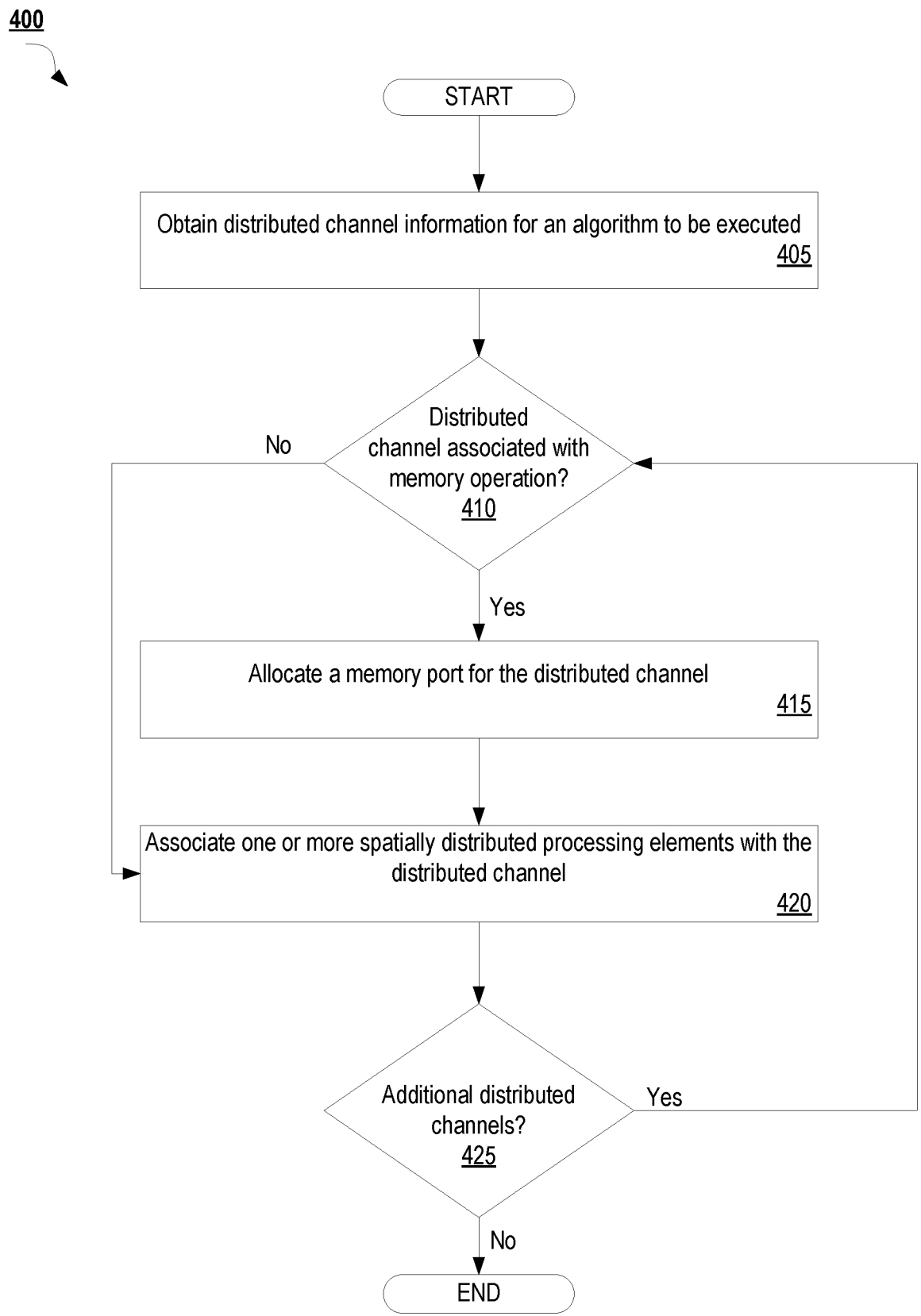
FIG. 4 is a flow diagram of generating a distributed channel according to an embodiment of the disclosure.

FIG. 4 is a flow diagram of a method 400 for generating a distributed channel according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by computing system 100 described with respect to FIG. 1.

At block 405, processing logic obtains distributed channel information for an algorithm to be executed. The algorithm can be executed by a spatial processing unit that includes a group of spatially distributed processing elements and a memory. The group of spatially distributed processing elements can share the memory, and the memory can include a memory controller to manage the flow of data going to and from the memory. The group of spatially distributed processing elements connect to the shared memory controller. A spatially distributed processing element can communicate with another spatially distributed processing element using a distributed channel, and a spatially distributed processing element can communicate with the memory using a distributed channel. The distributed channel information can include a number of distributed channels that will be used to execute the algorithm and a type of each distributed channel that will be used to execute the algorithm. The determination of the number of distributed channels and the type of each distributed channel used to execute the algorithm can be made by an operating system, by a system administrator, etc. For example, an algorithm loads data associated with a first address and a second address, calculates a sum of the data associated with the first address and the data associated with the second address, and stores the sum to a third address. The algorithm can be executed by 5 channels and the distributed channel information include information about the 5 distributed channels: 1) a load channel to load the first address, 2) a load channel to load the second address, 3) a non-memory arithmetic channel to calculate the sum, 4) a store data channel to generate the store data, and 5) a store address channel to generate the third address as the store address.

At block 410, processing logic determines whether a distributed channel is associated with a memory operation. In one embodiment, processing logic determines whether a distributed channel is associated with a memory operation by comparing the type to channel types that are associated with memory operations, such as a load channel, a store data channel, a store address channel, etc. For example, the distributed channel information includes a distributed channel with a load channel type and the channel types associated with memory operations are load channel, store data channel, and store address channel. The load channel type of the distributed channel is compared with the channel types associated with memory operations, and a match will occur because the distributed channel information indicates that the load channel is associated with a memory operation. If processing logic determines the distributed channel is not associated with a memory operation, the method 400 proceeds to block 420. If processing logic determines the distributed channel is associated with a memory operation, the method 400 proceeds to block 415.

At block 415, processing logic allocates a memory port for the distributed channel. The memory port can be an access port between a spatially distributed processing element in the SPU and the memory associated with the SPU.

At block 420, processing logic associates one or more spatially distributed processing elements with the distributed channel. In one embodiment, if a distributed channel is a non-memory arithmetic channel, processing logic associates one or more spatially distributed processing elements that are configured to perform one or more arithmetic operations. For example, for an arithmetic operation that sums three numbers A, B, and C, a first processing element calculates a sum of A and B to get sum S1, and a second processing element calculates a sum of S1 and C. In this example, the first processing element and the second processing element are associated with the non-memory arithmetic operation because those processing elements perform the arithmetic operation. In one embodiment, if a distributed channel is a load channel, processing logic associates the spatially distributed processing element that generates the load request and the spatially distributed processing element that receives the load response with the load channel. For example, for a load operation, a first processing element generates the load request and a second processing element receives the data from memory in response to the load request. In this example, the first processing element and the second processing element are associated with the load channel. In another example, if a distributed channel is a store data channel, processing logic associates the spatially distributed processing element that generates the store data with the store data channel. In another example, if a distributed channel is a store address channel, processing logic associates the spatially distributed processing element that generates the store address with the store address channel. In another example, if a distributed channel is a memory to memory indirection channel, processing logic associates the spatially distributed processing element that generates the load request with a load response channel.

In some optional embodiments, processing logic associates request information with the distributed channel upon associating one or more processing elements with the distributed channel. The request information can indicate how a memory element associated with the channel should treat the data once it arrives from the distributed channel without requiring the request information to be sent with the request from the distributed channel. Therefore, rather than sending the request information with the request from the processing element, the distributed channel already has the request information associated with it and the memory element can determine the information based on the distributed channel that made the request. For example, if a distributed channel is a load request channel, the request information indicates that the distributed channel data is cacheable. In this example, if a load request is made on the distributed channel, the memory element that receives the load request will cache the data based on the request information, without requiring the cacheable indication to be transmitted with the load request. The request information can include whether requests associated with the distributed channel are cacheable, not cacheable, coherent, not coherent, end of data, atomic store, etc.

At block 425, processing logic determines whether additional distributed channels are included in the distributed channel information. If there are additional distributed channels included in the distributed channel information, the method 400 returns to block 410. If there are no additional distributed channels included in the distributed channel information, the method 400 ends.

Figure 5:
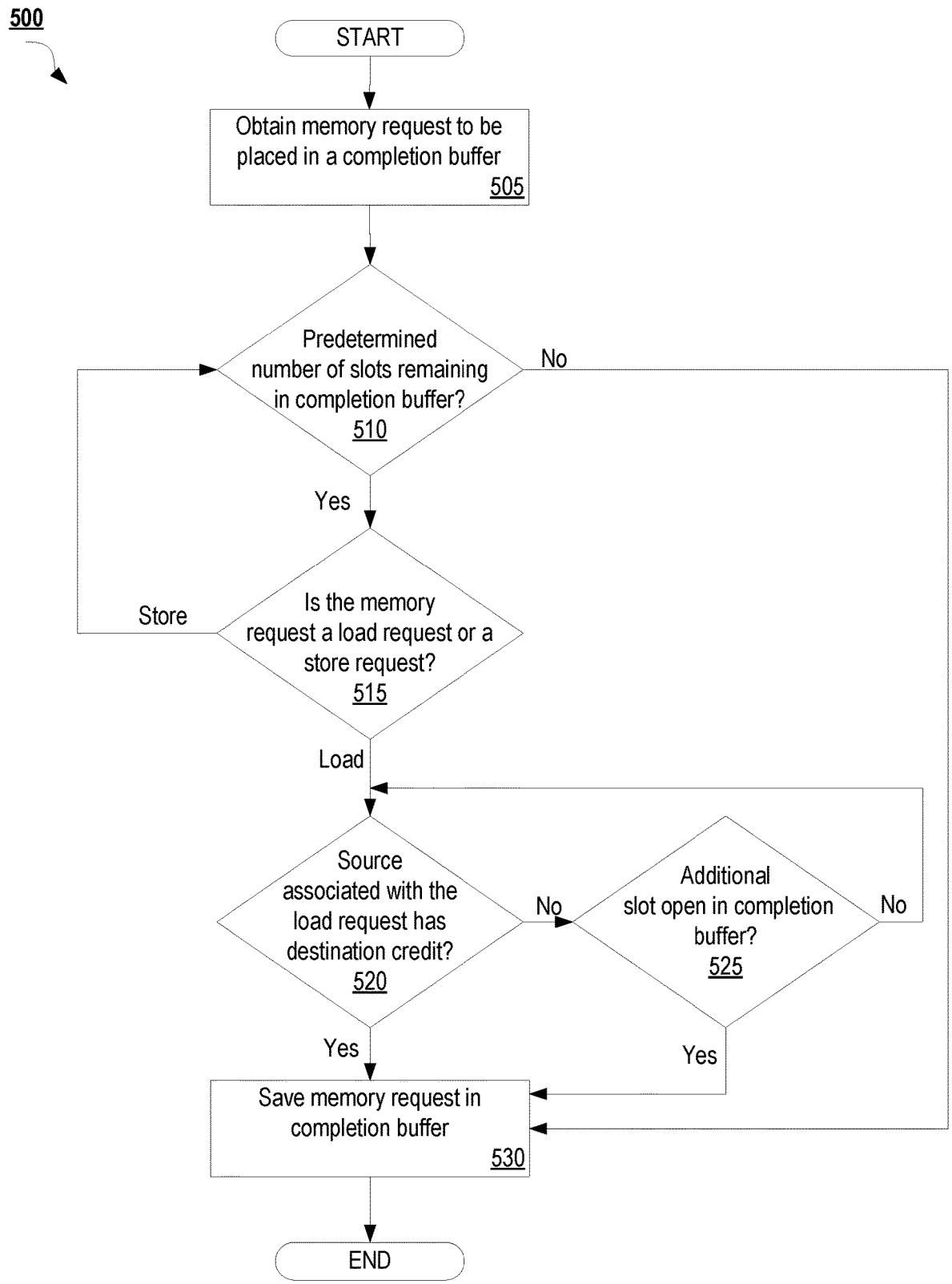
FIG. 5 is a flow diagram of maintaining a multi-source completion buffer according to an embodiment of the disclosure.

FIG. 5 is a flow diagram of a method 500 for maintaining a multi-source completion buffer according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by computing system 100 described with respect to FIG. 1.

At block 505, processing logic obtains a memory request to be placed in a completion buffer. The memory request can be a store request, a load request, or any other request that needs to be delivered to an application in program order or the data returned from the request needs to be delivered to an application in program order. Memory requests in a computing system may complete in different orders than they were issued. For example, if a load A misses in memory but the next load B hits in memory, then load B completes before load A, even though load A was issued first. If the application or the operating system that caused the memory requests to be issued requires that the memory requests be delivered in program order, a completion buffer can be used to hold the later-issued memory requests until all previous memory requests are ready to be returned to the application or operating system. For example, the completion buffer is used to hold load B until load A completes. The completion buffer can include multiple slots to hold multiple memory requests that are awaiting completion, and can be shared by multiple sources, such as channels in an SPU, processing cores in a multi-core computing system, processing elements in an SPU, etc.

At block 510, processing logic determines if a predetermined number of slots remain in the completion buffer. The predetermined number of slots can be a number of slots that need to remain in the completion buffer in order to guarantee or ensure that forward progress can be made by the requests in the completion buffer. The predetermined number of slots can be defined by a system administrator, an operating system, the application, etc. For example, the predetermined number of slots can be one (1). Processing logic can determine if a predetermined number of slots remain in the completion buffer by comparing the number of empty or unoccupied slots in the completion buffer to the predetermined number of slots. For example, if the completion buffer has one slot remaining and the predetermined number of slots is one, then processing logic will determine that the predetermined number of slots remain in the completion buffer. If processing logic determines that the predetermined number of slots do not remain, in the completion buffer, meaning that there are more slots than the predetermined number, the method 500 proceeds to block 530 to save the memory request in the completion buffer. If there are more than a predetermined number of slots in the completion buffer, the completion buffer can continue to be filled by any memory request, regardless of whether the memory request can make progress, thereby allowing for bursts of traffic from one or more sources. If processing logic determines that the predetermined number of slots remain, in the completion buffer, the method 500 proceeds to block 515. If only the predetermined number of slots remain in the completion buffer, fairness across channels is taken into account, and the memory request can only be inserted into the completion buffer if the memory request is associated with a source that is guaranteed to make forward progress, thereby avoiding deadlock.

At block 515, processing logic determines if the request is a load request or a store request. Processing logic can determine if the request is a load request or a store request based on a type associated with the request or using other conventional techniques commonly known in the art. If the request is a store request, the method 500 returns to block 510 to determine if a predetermined number of slots remain in the completion buffer such that the store request can be placed in the completion buffer. A store request cannot be allocated into the completion buffer if there are less than a predetermined number of slots remaining in the completion buffer because a store is not guaranteed to make forward progress. In such a case, the store request can cause deadlock if saved into the completion buffer when there are not a predetermined number of slots remaining in the completion buffer. For example, the predetermined number is a number greater than one. By waiting for a predetermined number of slots remain in the completion buffer, processing logic can guarantee that forward progress can be made even if the store is allocated into the completion buffer, since there is at least one additional slot that can be used by other requests that do make forward progress. Processing logic can continue to check for the predetermined number of slots in the completion buffer without requiring the store request to be issued again by an operating system or application. In one embodiment, if the request is a load request, the method 500 proceeds to block 520.

At block 520, processing logic determines if the source associated with the load request has a destination credit. A destination credit for a source can be the number of messages (e.g., requests, responses, etc.) associated with the source that can be sent to a destination. For example, if a source channel has 2 destination credits, the source channel can send 2 load requests to a destination channel, therefore guaranteeing that the source channel will make progress because it can send out the load requests and thus receive data from the destination channel for the load requests. The destination credit for a source can be decremented when a request exits the completion buffer because a message (e.g., request) was sent to the destination and therefore the source is waiting for a response to the message. The destination credit for a source can be incremented when the destination dequeues the message. A destination can dequeue the message when the destination has received the message and is obtaining a response to the message (e.g., load data is being obtained from memory for a load request). The destination credit for a source may not be modified when a request is saved or inserted into the completion buffer, because the request is not guaranteed yet to make forward progress. The request is guaranteed to make forward progress once a message for the request is dequeued by the destination. If processing logic determines that the source associated with the load request has a destination credit, the method 500 proceeds to block 530. If processing logic determines that the source associated with the load request does not have a destination credit, the method 500 proceeds to block 525.

At block 525, processing logic determines if an additional slot in the completion buffer has opened. Processing logic can determine if an additional slot in the completion buffer has opened by comparing the number of empty or unoccupied slots in the completion buffer to the predetermined number of slots. If the number of empty or unoccupied slots in the completion buffer is greater than the predetermined number of slots, processing logic can determine that an additional slot in the completion buffer has opened. If the number of empty or unoccupied slots in the completion buffer is equal to the predetermined number of slots, processing logic can determine that no additional slot in the completion buffer has opened. If processing logic determines that no additional slot in the completion buffer has opened, the method 500 can return to block 520 to determine if the source associated with the load request now has a destination credit associated with it because a message from the source has been dequeued by a destination and the source is guaranteed to make forward progress. If processing logic determines that an additional slot in the completion buffer has opened, the method 500 can proceed to block 530.

At block 530, processing logic can save the memory request in the completion buffer. Processing logic can save the memory request in the completion buffer by inserting or placing the request in an available slot or entry in the completion buffer.

Figure 6A:
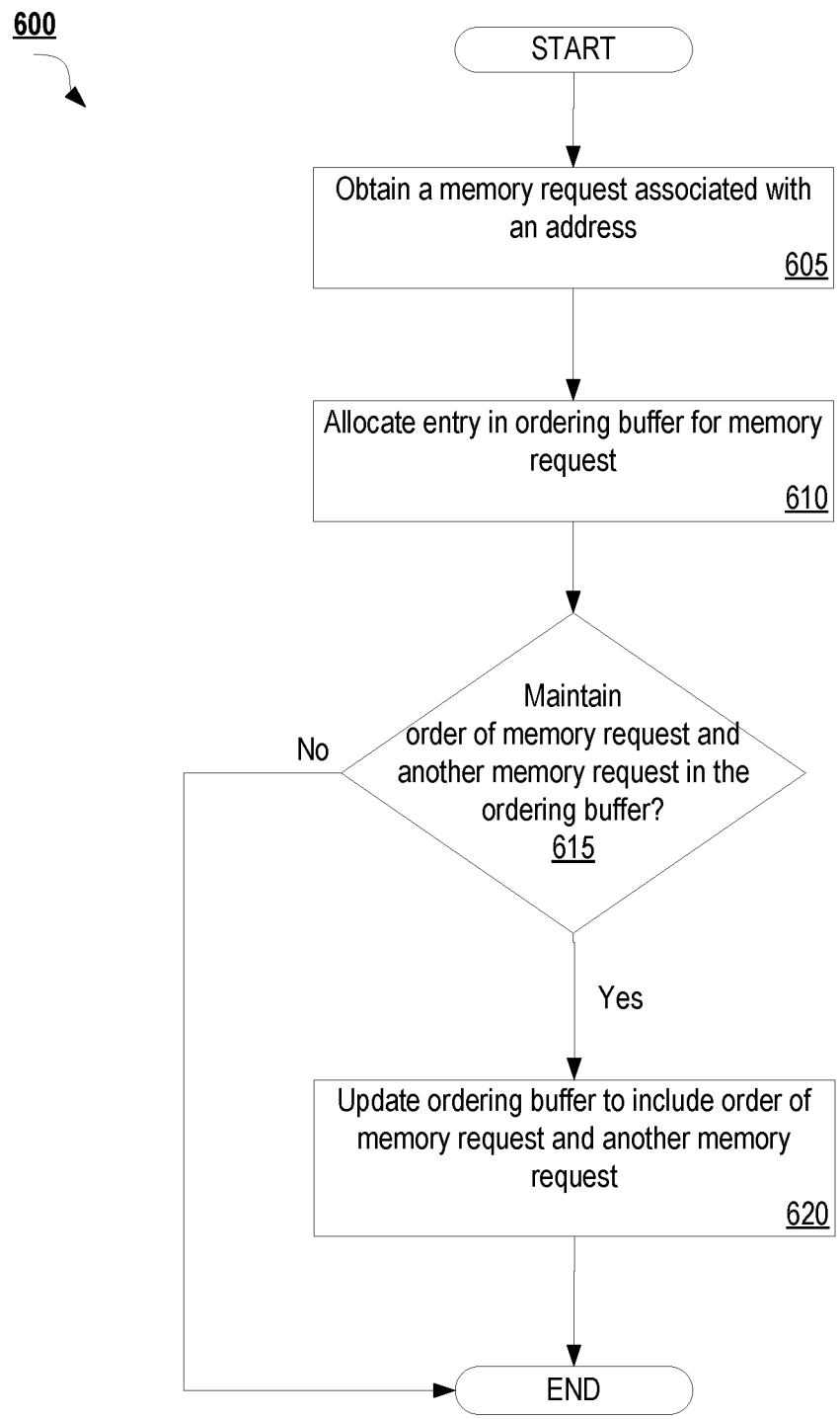
FIG. 6A is a flow diagram of maintaining an order of miss requests using an ordering buffer according to an embodiment of the disclosure.

FIG. 6A is a flow diagram of a method 600 for maintaining an order of miss requests according to an embodiment of the disclosure. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by computing system 100 described with respect to FIG. 1.

At block 605, processing logic obtains a memory request associated with an address, also referred to herein as a first memory request. The memory request can be a store request, a load request, or any other request for which an order may need to be maintained. For correctness, the requests from a source (e.g., channel in an SPU, processing elements in an SPU, cores in a computing system, etc.) need to be in order. For example, the $10^{th}$ load request from load request channel generates the $10^{th}$ response at memory. To achieve correctness, program order between memory requests, such as load request and store requests, can be maintained such that data written by the most recent store request is seen to later loads to the same memory address.

At block 610, processing logic allocates an entry in an ordering buffer for the memory request. The ordering buffer can be used to coalesce memory requests to the same address and maintain an order between the coalesced and non-coalesced memory requests to the same address. The ordering buffer can include multiple slots to hold multiple memory requests that miss in memory, such as a cache. The ordering buffer can be shared by multiple sources, such as channels in an SPU, processing cores in a multi-core computing system, processing elements in an SPU, etc. Processing logic can allocate an entry in the ordering buffer for the memory request by inserting or placing the memory request in an available slot or entry in the ordering buffer. The ordering buffer can be implemented as a group of data structures, with each data structure storing the requests associated with a specific address in order. For example, each entry in the ordering buffer for an address A will be included in a data structure associated with address A and each entry in the ordering buffer for an address B will be included in a data structure associated with address B. In one embodiment, the group of data structures is a group of linked lists, with a linked list for each distinct address in the ordering buffer. In this embodiment, the linked list includes a node for each entry associated with the address. Each node in the linked list includes an indication of whether the node is the head or oldest entry in the linked list, an indication of whether the node is the tail or newest entry in the linked list, and a reference (e.g., pointer) to the next node in the linked list. To allocate an entry in the ordering buffer, processing logic can update the data structure for the address associated with the memory request to include the new entry. In some embodiments, if the data structure is a linked list, to allocate an entry in the ordering buffer, a new node is created for the linked list. In one such embodiment, the new node is created as an empty node. In another such embodiment, the new node is created with the indication of whether the node is the head set to a positive value (e.g., TRUE, 1, etc.), the indication of whether the node is the tail set to a positive value (e.g., TRUE, 1, etc.), and the reference to the next node in the linked list set to a non-positive value (e.g., NULL, FALSE, 0, etc.). Other data structures that can maintain an order, such as an ordered tree, a first-in-first-out (FIFO) queue, a stack, an associative array, etc., without departing from the scope of the present disclosure.

At block 615, processing logic determines if an order of the memory request and another memory request in the ordering buffer needs to be maintained. The another memory request can be a request to the same address as the first memory request. In some embodiments, the another memory request was obtained prior to the first memory request being obtained and has an existing entry in the ordering buffer. The another request is also referred to herein as a second memory request.

In one embodiment, processing logic determines if an order of the memory request and the another memory request needs to be maintained by comparing the address of the memory request to the address for each entry allocated in the ordering buffer. In this embodiment, if the address of the memory request matches the address for another entry allocated in the ordering buffer, processing logic determines that the order of the memory request and the another memory request (corresponding to the another entry allocated in the ordering buffer that has the same address) needs to be maintained. For example, the ordering buffer has a store request to address A and a load request to address B. In this example, a store request to address B is obtained, which corresponds to the first memory request, and an entry in the ordering buffer is allocated for the store request to address B. In this example, processing logic compares address B from the store request to the entries in the ordering buffer, and determines that an order between the store request to address B and the load request to address B needs to be maintained. In this embodiment, processing logic determines that the order of the memory request and the another memory request does not need to be maintained if the address of the memory request does not match the address for any other entry allocated in the ordering buffer.

In an alternate embodiment, processing logic determines if an order of the memory request and the another memory request needs to be maintained by comparing the address of the memory request to the address associated with each data structure in the ordering buffer. For example, the ordering buffer includes a linked list for each address in the ordering buffer, and has a first linked list for all requests to address A and a second linked list for all requests to address B. In this example, if a memory request to address B is obtained, processing logic compares address B to address A associated with the first linked list and address B associated with the second linked list, and determines that a data structure exists in the ordering buffer for address B.

If processing logic determines that the order of the memory request and another memory request in the ordering buffer does not need to be maintained, the method 600 ends. In some embodiments, if processing logic determines that the order of the memory request and another memory request in the ordering buffer does not need to be maintained, processing logic updates the entry allocated in the ordering buffer for the memory request to indicate that the entry is the only entry associated with the address. In one embodiment, if the ordering buffer includes a linked list for the address, the node allocated for the memory request is updated to indicate that the node is the head of the linked list (indication of whether the node is the head set to a positive value, such as TRUE, 1, etc.), that the node is the tail of the linked list (because it is the only node the indication of whether the node is the tail set to a positive value, such as TRUE, 1, etc.), and that the next pointer does not point to a next entry (the reference to the next node in the linked list set to a non-positive value, such as NULL, FALSE, 0, etc.).

If processing logic determines that the order of the memory request and another memory request in the ordering buffer needs to be maintained, the method 600 proceeds to block 620.

At block 620, processing logic can update the ordering buffer to include an order of the memory request and the another memory request. Processing logic can update the ordering buffer to include an order of the memory request and the another memory request by updating the data structure for the address associated with the memory requests. In one embodiment, if the ordering buffer includes a linked list for the address, the node allocated for the first memory request is updated to indicate that the node is not the head of the linked list (indication of whether the node is the head set to a non-positive value, such as FALSE, 0, etc.) because the second or another memory request is older than the first memory request, that the node is the tail of the linked list (because it is the newest node, the indication of whether the node is the tail set to a positive value, such as TRUE, 1, etc.), and that the next pointer does not point to a next entry because this is the last entry of the linked list (the reference to the next node in the linked list set to a non-positive value, such as NULL, FALSE, 0, etc.). In this embodiment, the node allocated for the another (or second) memory request is updated to indicate that the node is not the tail of the linked list (because there is a newer node for the first memory request then the current node cannot be the tail and the indication of whether the node is the tail is set to a non-positive value, such as FALSE, 0, etc.) and to indicate that the next pointer points to the node associated with the first memory request. For example, the ordering buffer includes a data structure for address A with 2 nodes X and Y, with X being the older request, and a load request for address A is obtained. In this example, a new node Z is allocated for the load request. Because the data structure includes other nodes, the order of the requests associated with the nodes must be maintained, and the data structure is updated to include node Z, where the head of node Z is non-positive, the tail of node Z is positive (because it is the newest entry), the pointer of node Z is non-positive (because there is no node newer or after node Z), the tail of Y is updated to non-positive (because Y is no longer the tail of the data structure), and the next pointer of Z is updated to point to node Z.

Figure 6B:
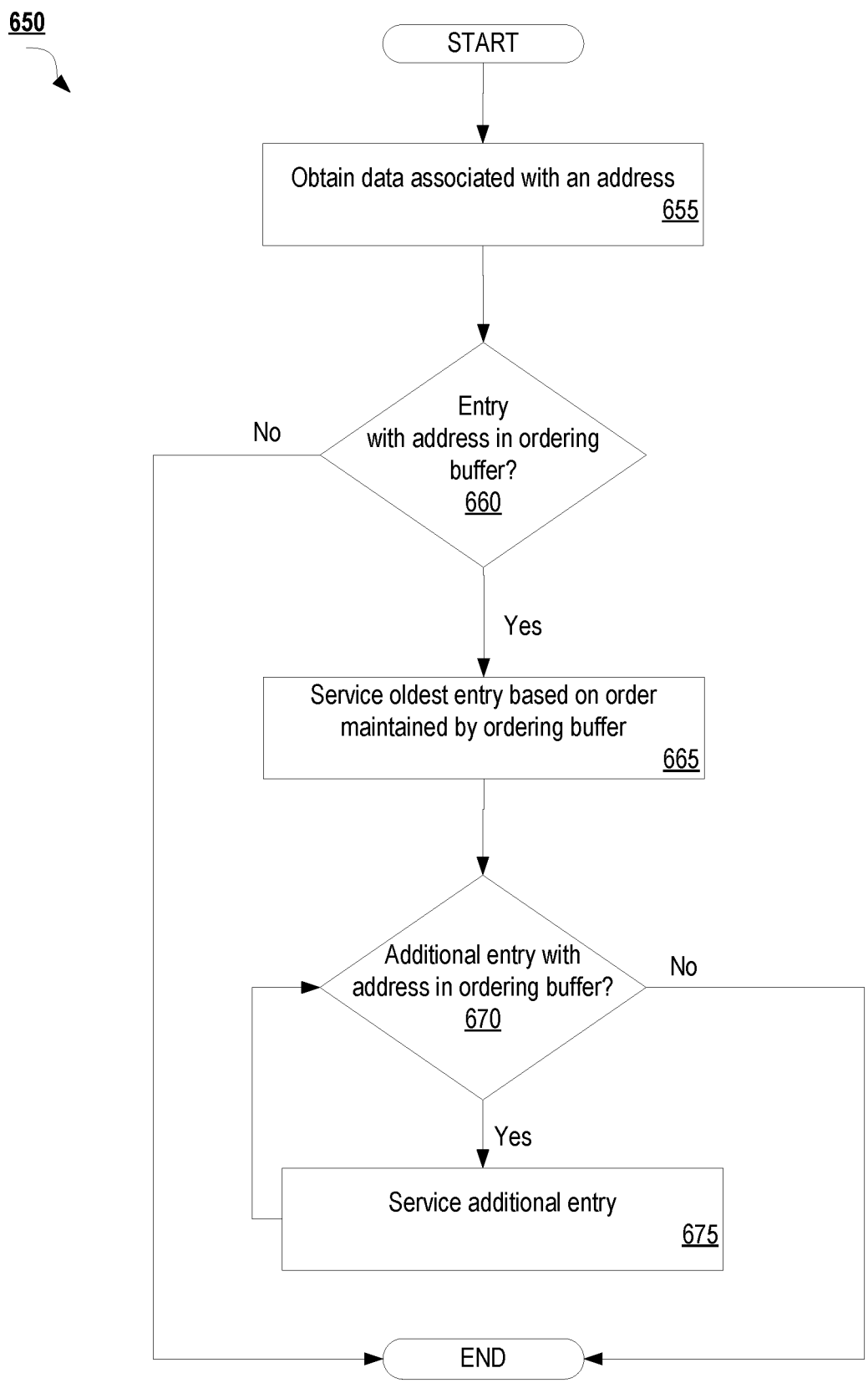
FIG. 6B is a flow diagram of servicing miss requests using an ordering buffer according to an embodiment of the disclosure.

FIG. 6B is a flow diagram of a method 650 for of servicing miss requests using an ordering buffer according to an embodiment of the disclosure. Method 650 may be performed by processing logic that may comprise hardware (e.g., circuitry, dedicated logic, programmable logic, microcode, etc.), software (such as instructions run on a processing device), firmware, or a combination thereof. In one embodiment, method 650 is performed by computing system 100 described with respect to FIG. 1.

At block 655, processing logic obtains data associated with an address. The data can be received for an outstanding memory request, such as a store request, a load request, or any other request that receives data as a response.

At block 660, processing logic determines if an entry with the address is included in an ordering buffer. The ordering buffer can be used to coalesce memory requests to the same address and maintain an order between the coalesced and non-coalesced memory requests to the same address. The ordering buffer can include multiple slots to hold multiple memory requests that miss in memory, such as a cache. The ordering buffer can be shared by multiple sources, such as channels in an SPU, processing cores in a multi-core computing system, processing elements in an SPU, etc. The ordering buffer can be implemented as a group of data structures, with each data structure storing the requests associated with a specific address in order.

In one embodiment, processing logic determines if an entry with the address is included in the ordering buffer by comparing the address associated with the data to the address for each entry allocated in the ordering buffer. In this embodiment, if the address associated with the data matches the address for another entry allocated in the ordering buffer, processing logic determines that there is an entry with the address in the ordering buffer. For example, the ordering buffer has a store request to address A and a load request to address B. In this example, data associated with address B is obtained and processing logic compares address B from the data to the entries in the ordering buffer, and determines that an entry (load request to address B) is in the ordering buffer. In this embodiment, processing logic determines that an entry with the address is not in the ordering buffer if the address associated with the data does not match the address for any entry in the ordering buffer.

In an alternate embodiment, processing logic determines if an entry with the address is in the ordering buffer by comparing the address associated with the data to the address associated with each data structure in the ordering buffer. For example, the ordering buffer includes a linked list for each address in the ordering buffer, and has a first linked list for all requests to address A and a second linked list for all requests to address B. In this example, if data for address B is obtained, processing logic compares address B to address A associated with the first linked list and address B associated with the second linked list, and determines that an entry with address B exists in the ordering buffer.

If processing logic determines that there is no entry with the address in the ordering buffer, the method 650 ends because no entries in the ordering buffer need to be serviced using the data. If processing logic determines that there is an entry with the address in the ordering buffer, the method 650 proceeds to block 665.

At block 665, processing logic services the oldest entry associated with the address based on an order maintained by the ordering buffer. Processing logic can service the oldest entry by determining the oldest entry based on the order maintained by the ordering buffer and providing the data associated with the address to the memory request associated with the oldest entry. In one embodiment, if the memory request is a load request, processing logic services the oldest entry by providing the data associated with the address to the load request. In an alternate embodiment, if the memory request is a load request, processing logic services the oldest entry by providing data from memory to the load request because memory has not yet been updated with a store to the address. In one embodiment, if the memory request is a store request, processing logic services the oldest entry by determining the oldest entry based on the order maintained by the ordering buffer and updating memory to include store data included in the store request. In this embodiment, processing logic can update memory to include store data included in the store request by storing the store data to an address of the memory to which the store request is made. In this embodiment, processing logic uses the updated memory to service entries that are newer than the oldest entry. For example, the ordering buffer includes a store request with data A to memory address B and a later load request to address B. In this example, processing logic will update the memory address B to store data A and provide data A to the subsequent load request to address B. Processing logic can determine the oldest entry based on the order maintained by the ordering buffer by determining the oldest entry in the data structure for the address. In one embodiment, if the ordering buffer maintains an order using linked lists, processing logic determines that the head of the linked list for the address is the oldest entry. In alternate embodiments, if the ordering buffer maintains an order using a different data structure, processing logic determines an oldest entry based on the type of data structure. For example, if the data structure is a FIFO queue, the oldest entry is the first entry in the FIFO queue.

At block 670, processing logic determines if an additional entry with the address is in the ordering buffer. Processing logic can determine if an additional entry with the address is in the ordering buffer based on the data structure for the address. In one embodiment, if the data structure for the address is a linked list, processing logic determines if there is an additional entry in the data structure using a next pointer from the last serviced entry. For example, if the last entry in the data structure that was serviced using the data was the head of the linked list, processing logic will use the next pointer of the head to determine if there are any additional entries in the linked list. If the next pointer is a positive value, processing logic determines that an additional entry with the address is in the ordering buffer. If the next pointer is a non-positive value (e.g., NULL, FALSE, 0, etc.), processing logic determines that no additional entry with the address is in the ordering buffer. If another example, if the last entry in the data structure that was serviced using the data was the first entry of a FIFO queue, processing logic will determine if the queue has an additional entry. If the FIFO queue has an additional entry, processing logic determines that an additional entry with the address is in the ordering buffer and if the FIFO queue does not have an additional entry, processing logic determines that no additional entry with the address is in the ordering buffer. If processing logic determines that there is no additional entry with the address is in the ordering buffer, the method 650 ends because all of the entries for the address have been serviced in order using the data associated with the address. In some optional embodiments, if processing logic determines that there is no additional entry with the address is in the ordering buffer, the data structure for the address is removed from the ordering buffer. If processing logic determines that there is an additional entry with the address in the ordering buffer, the method 650 proceeds to block 675.

At block 675, processing logic services the additional entry associated with the address based on an order maintained by the ordering buffer. Processing logic can service the additional entry by providing the data associated with the address to the memory request associated with the additional entry. Upon providing the data associated with the address to the memory request, processing logic can return to block 670 to determine if an additional entry with the address is in the ordering buffer, thereby servicing the subsequent misses in an order indicated by the ordering buffer until all of the entries for the address are serviced. Therefore, all requests to an address will be serviced in order using a single ordering buffer until no additional entries for the address are found.

Figure 7A:
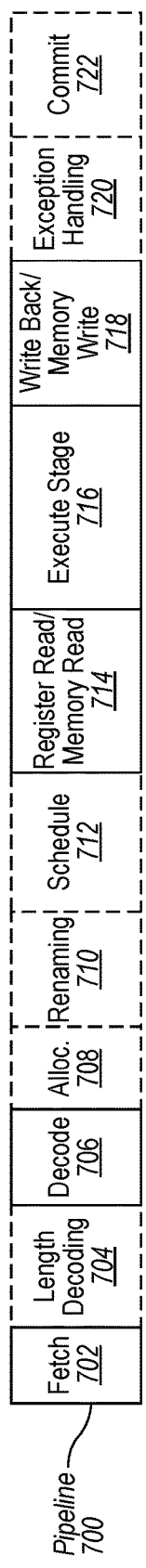
FIG. 7A is a block diagram illustrating a micro-architecture for a processor that implements distributed load store operations in which one embodiment of the disclosure may be used.
Figure 7B:
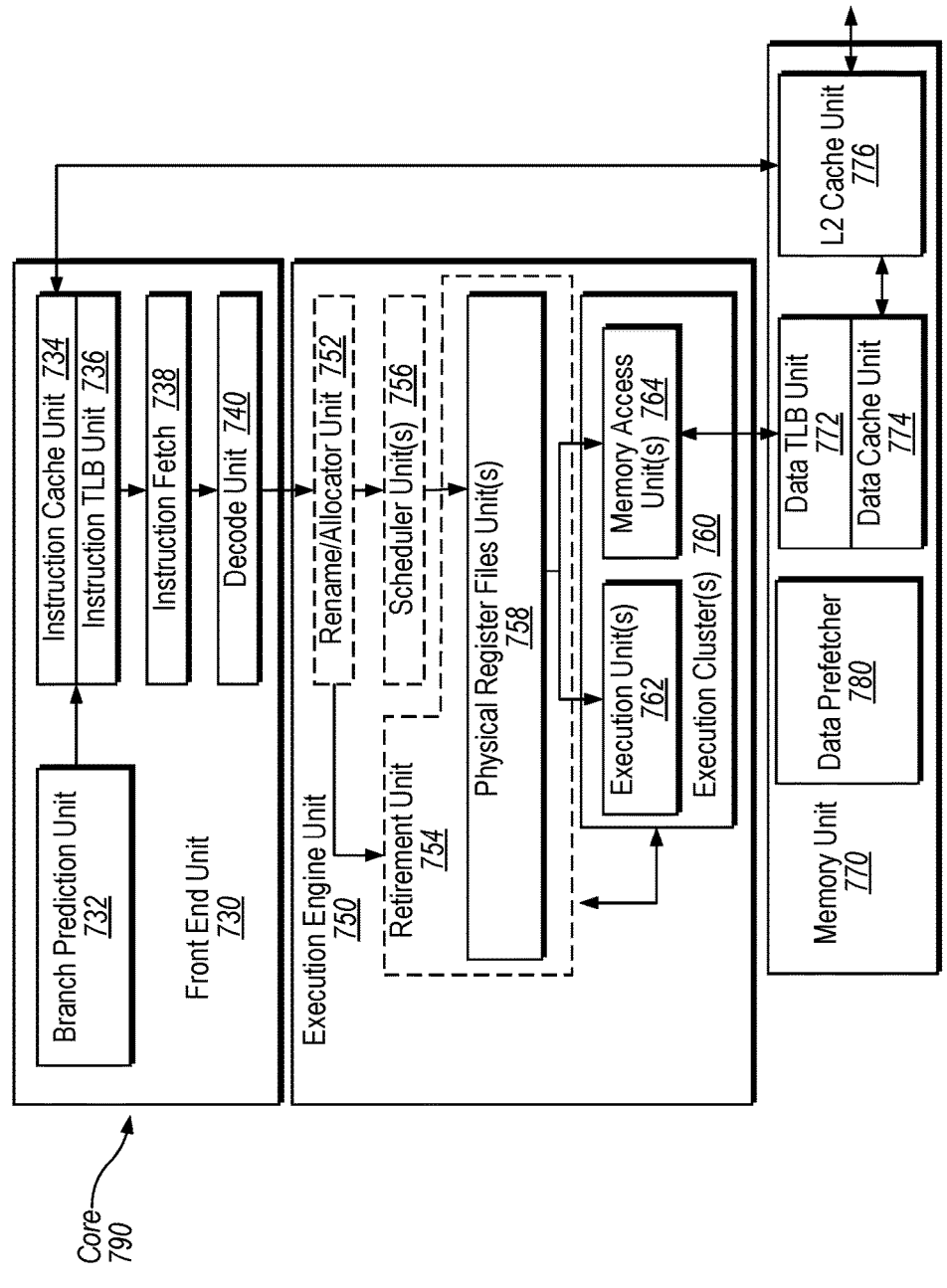
FIG. 7B is a block diagram illustrating an in-order pipeline and a register renaming stage, out-of-order issue/execution pipeline implemented according to at least one embodiment of the disclosure.

FIG. 7A is a block diagram illustrating an in-order pipeline and a register renaming stage, out-of-order issue/execution pipeline implemented by core 790 of FIG. 7B according to some embodiments of the disclosure. The solid lined boxes in FIG. 7A illustrate an in-order pipeline, while the dashed lined boxes illustrates a register renaming, out-of-order issue/execution pipeline. In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724. In some embodiments, the ordering of stages 702-724 may be different than illustrated and are not limited to the specific ordering shown in FIG. 7A.

FIG. 7B is a block diagram illustrating a micro-architecture for a core 790 that implements distributed memory operations in accordance with one embodiment of the disclosure. Specifically, core 790 depicts an in-order architecture core and a register renaming logic, out-of-order issue/execution logic to be included in a processor according to at least one embodiment of the disclosure.

Core 790 includes a front end unit 730 coupled to an execution engine unit 750, and both are coupled to a memory unit 770. Core 790 may include a reduced instruction set computing (RISC) core, a complex instruction set computing (CISC) core, a very long instruction word (VLIW) core, or a hybrid or alternative core type. As yet another option, core 790 may include a special-purpose core, such as, for example, a network or communication core, compression engine, graphics core, or the like. In one embodiment, core 790 may be a multi-core processor or may part of a multi-processor system.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. Decode unit 740 (also known as a decoder) may decode instructions, and generate as an output one or more micro-operations, micro-code entry points, microinstructions, other instructions, or other control signals, which are decoded from, or which otherwise reflect, or are derived from, the original instructions. Decode unit 740 may be implemented using various different mechanisms. Examples of suitable mechanisms include, but are not limited to, look-up tables, hardware implementations, programmable logic arrays (PLAs), microcode read only memories (ROMs), etc. Instruction cache unit 734 is further coupled to memory unit 770. Decode unit 740 is coupled to a rename/allocator unit 752 in the execution engine unit 750.

Execution engine unit 750 includes the rename/allocator unit 752 coupled to a retirement unit 754 and a set of one or more scheduler unit(s) 756. Scheduler unit(s) 756 represents any number of different schedulers, including reservations stations (RS), central instruction window, etc. Scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the core or processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which may include a data prefetcher 780, a data TLB unit 772, a data cache unit (DCU) 774, and a level 2 (L2) cache unit 776, to name a few examples. In some embodiments DCU 774 is also known as a first level data cache (L1 cache). The DCU 774 may handle multiple outstanding cache misses and continue to service incoming stores and loads. It also supports maintaining cache coherency. The data TLB unit 772 is a cache used to improve virtual address translation speed by mapping virtual and physical address spaces. In one exemplary embodiment, the memory access units 764 may include a load unit, a store address unit, and a store data unit, each of which is coupled to the data TLB unit 772 in the memory unit 770. The L2 cache unit 776 may be coupled to one or more other levels of cache and eventually to a main memory.

In one embodiment, the data prefetcher 780 speculatively loads/prefetches data to the DCU 774 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

Core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the core 490 also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
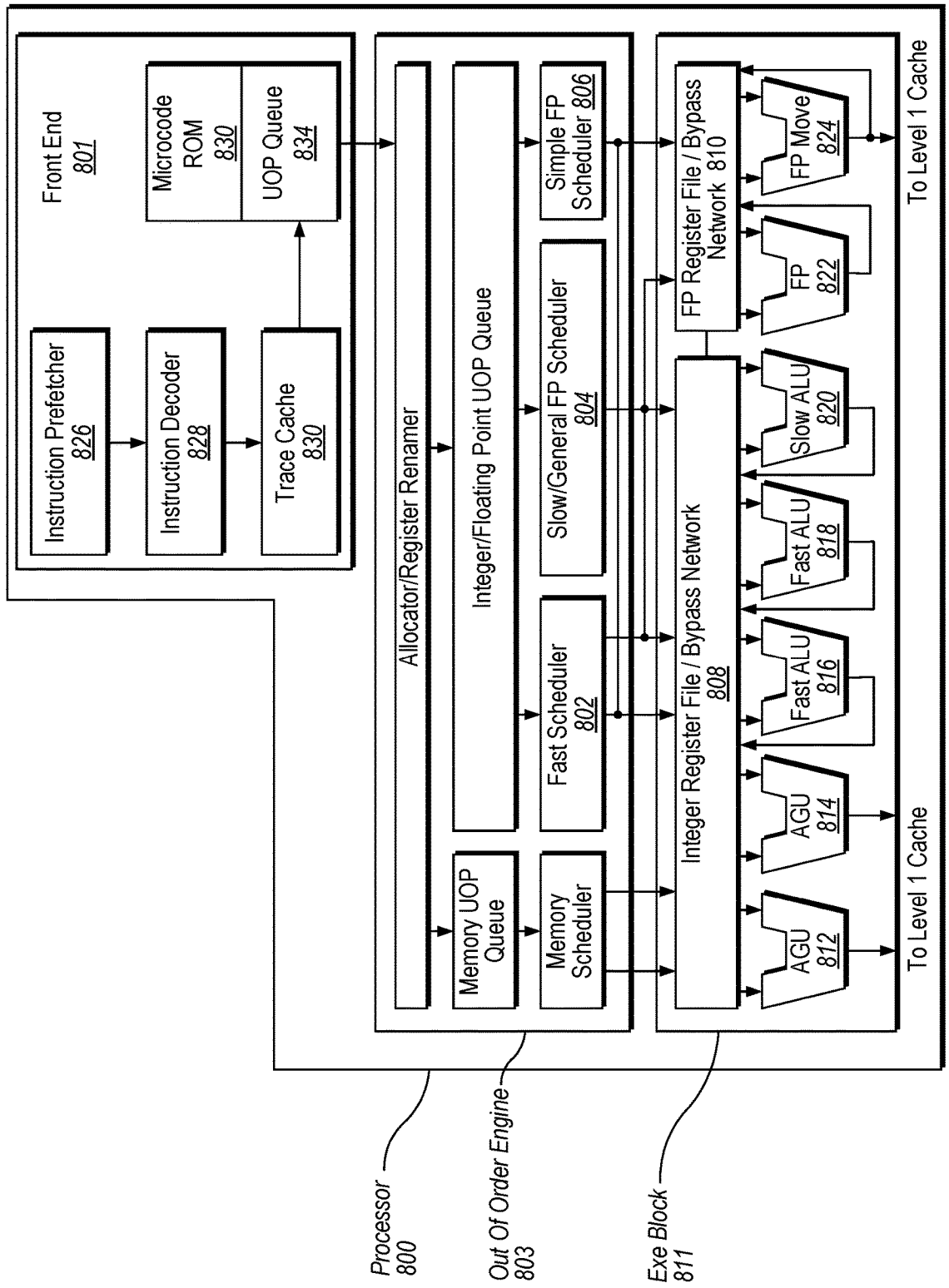
FIG. 8 illustrates a block diagram of the micro-architecture for a processor that includes logic circuits to perform distributed load store operations in accordance with one embodiment of the disclosure.

FIG. 8 illustrates a block diagram of the micro-architecture for a processor 800 that includes logic circuits to implement distributed memory operations in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 801 is the part of the processor 800 that fetches instructions to be executed and prepares them to be used later in the processor pipeline.

The front end 801 may include several units. In one embodiment, the instruction prefetcher 826 fetches instructions from memory and feeds them to an instruction decoder 828 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one embodiment, if more than four micro-ops are needed to complete an instruction, the decoder 828 accesses the microcode ROM 832 to do the instruction. For one embodiment, an instruction can be decoded into a small number of micro ops for processing at the instruction decoder 828. In another embodiment, an instruction can be stored within the microcode ROM 832 should a number of micro-ops be needed to accomplish the operation. The trace cache 830 refers to a entry point programmable logic array (PLA) to determine a correct micro-instruction pointer for reading the micro-code sequences to complete one or more instructions in accordance with one embodiment from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one embodiment can schedule on each half of the main clock cycle while the other schedulers can only schedule once per main processor clock cycle. The schedulers arbitrate for the dispatch ports to schedule uops for execution.

Register files 808, 810, sit between the schedulers 802, 804, 806, and the execution units 812, 814, 816, 818, 820, 822, 824 in the execution block 811. There is a separate register file 808, 810, for integer and floating point operations, respectively. Each register file 808, 810, of one embodiment also includes a bypass network that can bypass or forward just completed results that have not yet been written into the register file to new dependent uops. The integer register file 808 and the floating point register file 810 are also capable of communicating data with the other. For one embodiment, the integer register file 808 is split into two separate register files, one register file for the low order 32 bits of data and a second register file for the high order 32 bits of data. The floating point register file 810 of one embodiment has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processor 800 of one embodiment is comprised of a number of execution units: address generation unit (AGU) 812, AGU 814, fast ALU 816, fast ALU 818, slow ALU 820, floating point ALU 822, floating point move unit 824. For one embodiment, the floating point execution blocks 822, 824, execute floating point, MMX, SIMD, and SSE, or other operations. The floating point ALU 822 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 816, 818. The fast ALUs 816, 818, of one embodiment can execute fast operations with an effective latency of half a clock cycle. For one embodiment, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one embodiment, the integer ALUs 816, 818, 820, are described in the context of performing integer operations on 64 bit data operands. In alternative embodiments, the ALUs 816, 818, 820, can be implemented to support a variety of data bits including 16, 32, 128, 256, etc. Similarly, the floating point units 822, 824, can be implemented to support a range of operands having bits of various widths. For one embodiment, the floating point units 822, 824, can operate on 128 bits wide packed data operands in conjunction with SIMD and multimedia instructions.

In one embodiment, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 800 also includes logic to implement distributed memory operations according to embodiments of the disclosure. In one embodiment, the execution block 811 of processor 800 may include an distributed channel module to implement distributed memory operations according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 9:
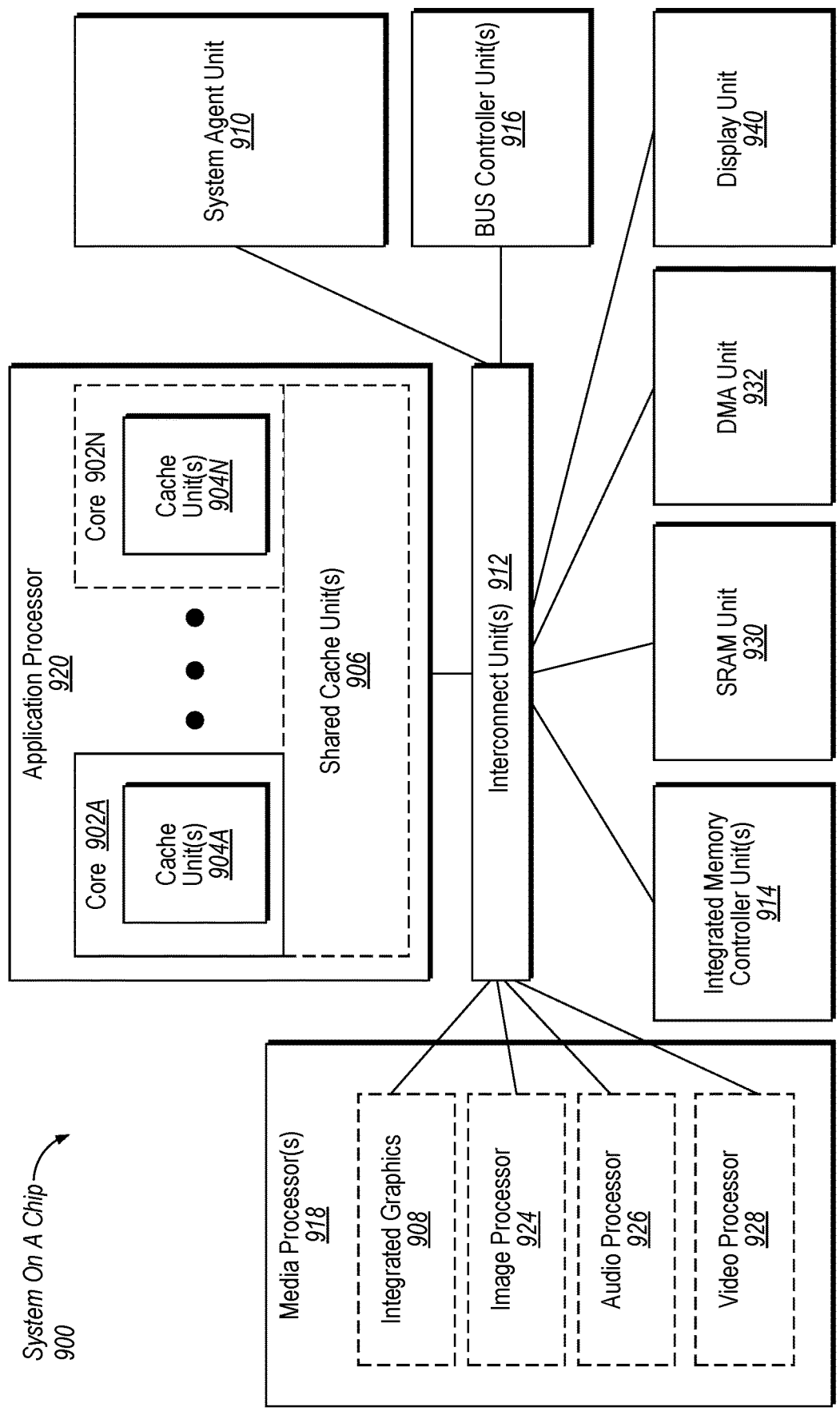
FIG. 9 is a block diagram of a computer system according to an embodiment of the disclosure.

FIG. 9 is a block diagram of a SoC 900 that includes logic circuits to implement a distributed memory operations in accordance with an embodiment of the present disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multithreading.

The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the application processor 920 may be from another company, such as ARM Holdings, Ltd, MIPS, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

In one embodiment, the application processor 920 is a processor that also includes logic to implement distributed memory operations according to embodiments of the present invention. For example, the application processor 920 may include logic to execute distributed channel module, such as distributed channel module 115 described with respect to FIG. 1, where the distributed channel module 115 can obtain distributed channel information for an algorithm to be executed and for each distributed channel in the distributed channel information, determine if the distributed channel is associated with a memory operation and associate one or more spatially distributed processing elements with the distributed channel. Upon determining that the distributed channel is associated with a memory operation, the distributed channel module 115 can allocate a memory port for the distributed channel. Moreover, the distributed channel module 115 can further maintain a multi-source completion buffer to dynamically allocate buffer slots among multiple sources without creating deadlocks. In addition, the distributed channel module 115 can further maintain an order of miss requests using an ordering buffer and service miss requests using the ordering buffer.

Figure 10:
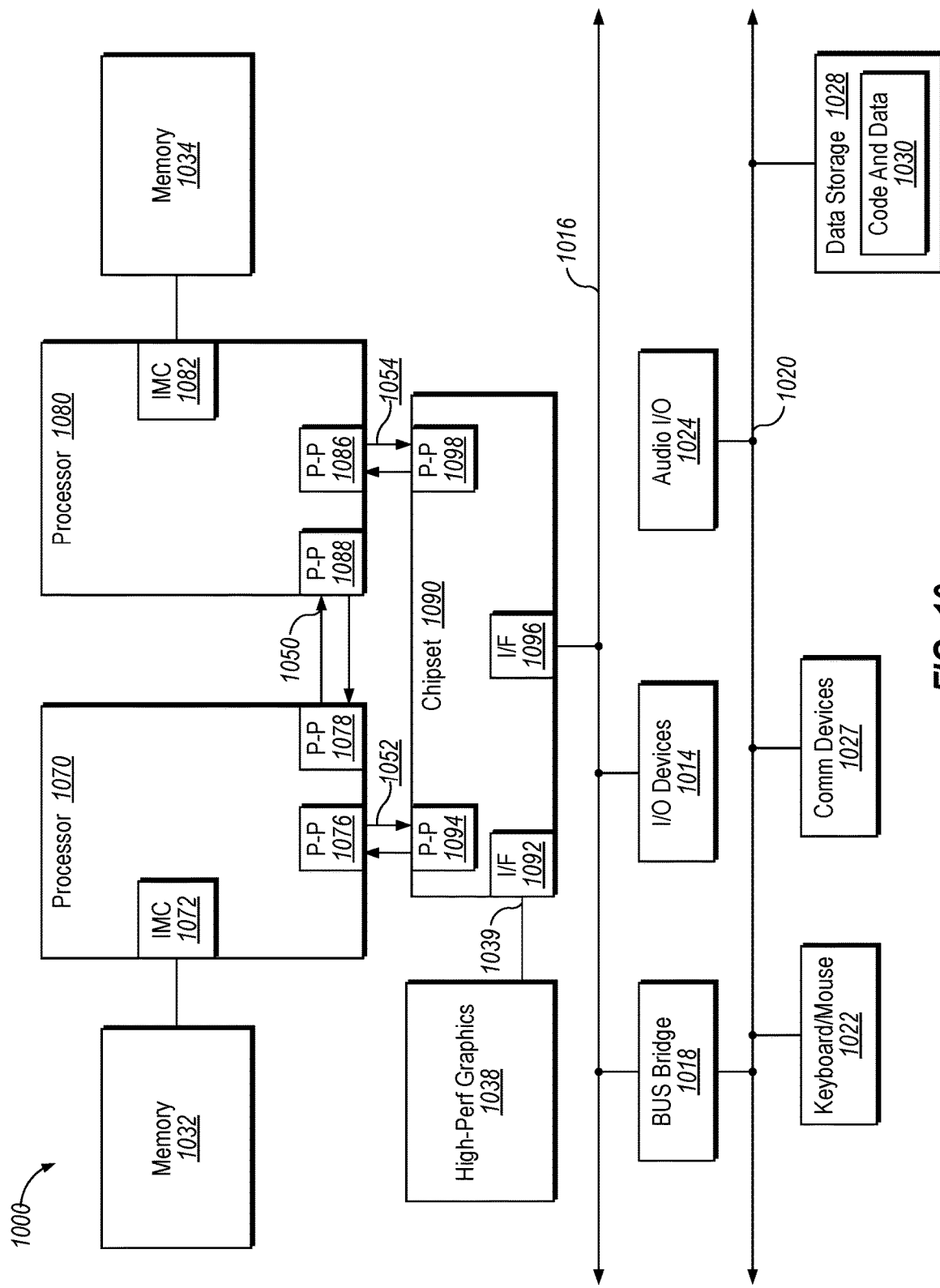
FIG. 10 is a block diagram illustrating a system in which an embodiment of the disclosure may be used.

Referring now to FIG. 10, shown is a block diagram illustrating a system 1000 in which an embodiment of the disclosure may be used. As shown in FIG. 10, multiprocessor system 1000 is a point-to-point interconnect system, and includes a first processor 1070 and a second processor 1080 coupled via a point-to-point interconnect 1050. While shown with only two processors 1070, 1080, it is to be understood that the scope of embodiments of the disclosure is not so limited. In other embodiments, one or more additional processors may be present in a given processor. In one embodiment, the multiprocessor system 1000 may implement distributed memory operations as described herein.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10 various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 730, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
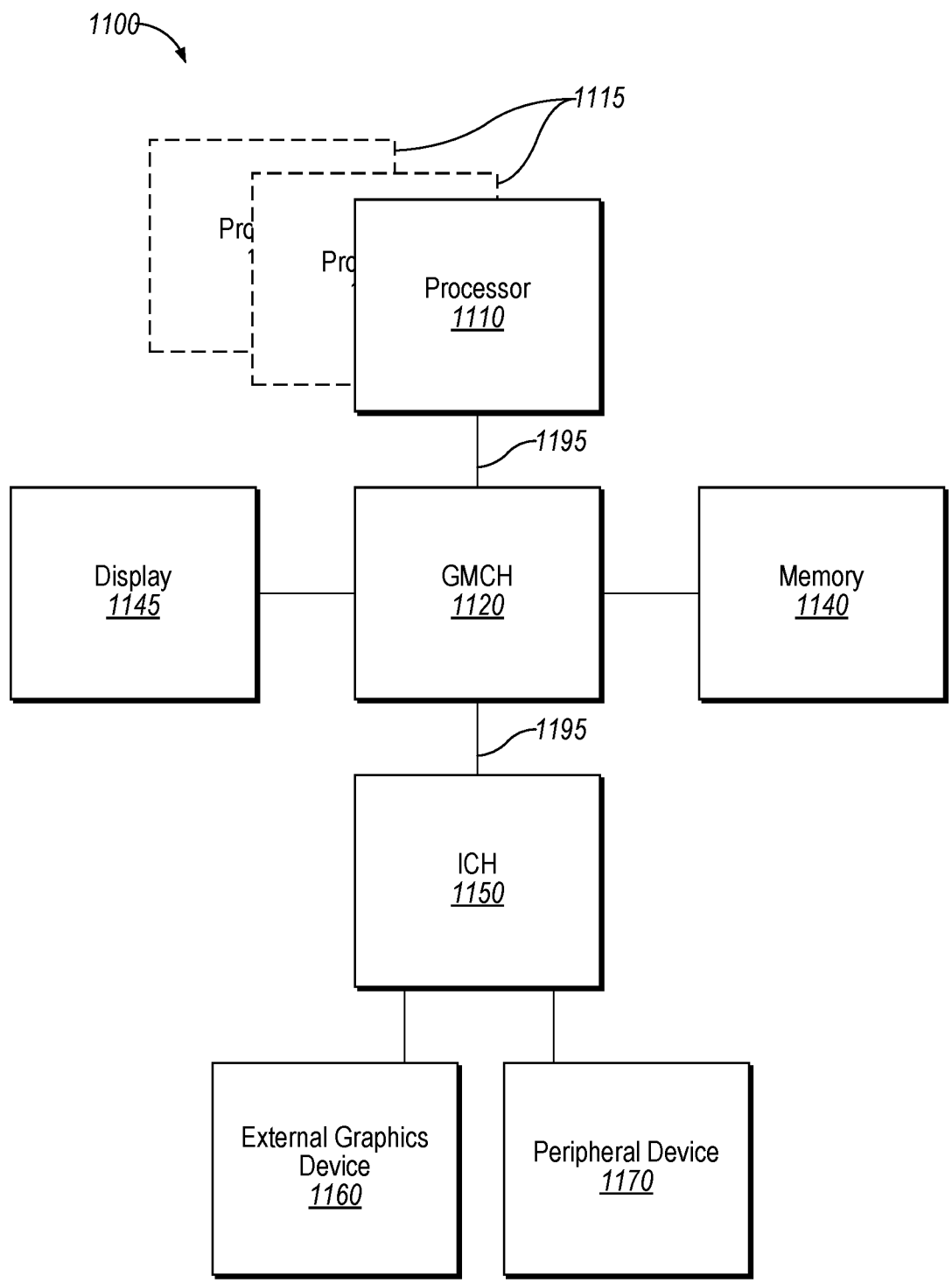
FIG. 11 is a block diagram of a system in which an embodiment of the disclosure may operate.

Referring now to FIG. 11, shown is a block diagram of a system 1100 in which one embodiment of the disclosure may operate. The system 1100 may include one or more processors 1110, 1115, which are coupled to graphics memory controller hub (GMCH) 1120. The optional nature of additional processors 1115 is denoted in FIG. 11 with broken lines. In one embodiment, processors 1110, 1115 implement distributed memory operations according to embodiments of the disclosure.

Each processor 1110, 1115 may be some version of the circuit, integrated circuit, processor, and/or silicon integrated circuit as described above. However, it should be noted that it is unlikely that integrated graphics logic and integrated memory control units would exist in the processors 1110, 1115. FIG. 11 illustrates that the GMCH 1120 may be coupled to a memory 1140 that may be, for example, a dynamic random access memory (DRAM). The DRAM may, for at least one embodiment, be associated with a non-volatile cache.

The GMCH 1120 may be a chipset, or a portion of a chipset. The GMCH 1120 may communicate with the processor(s) 1110, 1115 and control interaction between the processor(s) 1110, 1115 and memory 1140. The GMCH 1120 may also act as an accelerated bus interface between the processor(s) 1110, 1115 and other elements of the system 1100. For at least one embodiment, the GMCH 1120 communicates with the processor(s) 1110, 1115 via a multi-drop bus, such as a frontside bus (FSB) 1195.

Furthermore, GMCH 1120 is coupled to a display 1145 (such as a flat panel or touchscreen display). GMCH 1120 may include an integrated graphics accelerator. GMCH 1120 is further coupled to an input/output (I/O) controller hub (ICH) 1150, which may be used to couple various peripheral devices to system 1100. Shown for example in the embodiment of FIG. 11 is an external graphics device 1160, which may be a discrete graphics device, coupled to ICH 1150, along with another peripheral device 1170.

Alternatively, additional or different processors may also be present in the system 1100. For example, additional processor(s) 1115 may include additional processors(s) that are the same as processor 1110, additional processor(s) that are heterogeneous or asymmetric to processor 1110, accelerators (such as, e.g., graphics accelerators or digital signal processing (DSP) units), field programmable gate arrays, or any other processor. There can be a variety of differences between the processor(s) 1110, 1115 in terms of a spectrum of metrics of merit including architectural, micro-architectural, thermal, power consumption characteristics, and the like. These differences may effectively manifest themselves as asymmetry and heterogeneity amongst the processors 1110, 1115. For at least one embodiment, the various processors 1110, 1115 may reside in the same die package.

Figure 12:
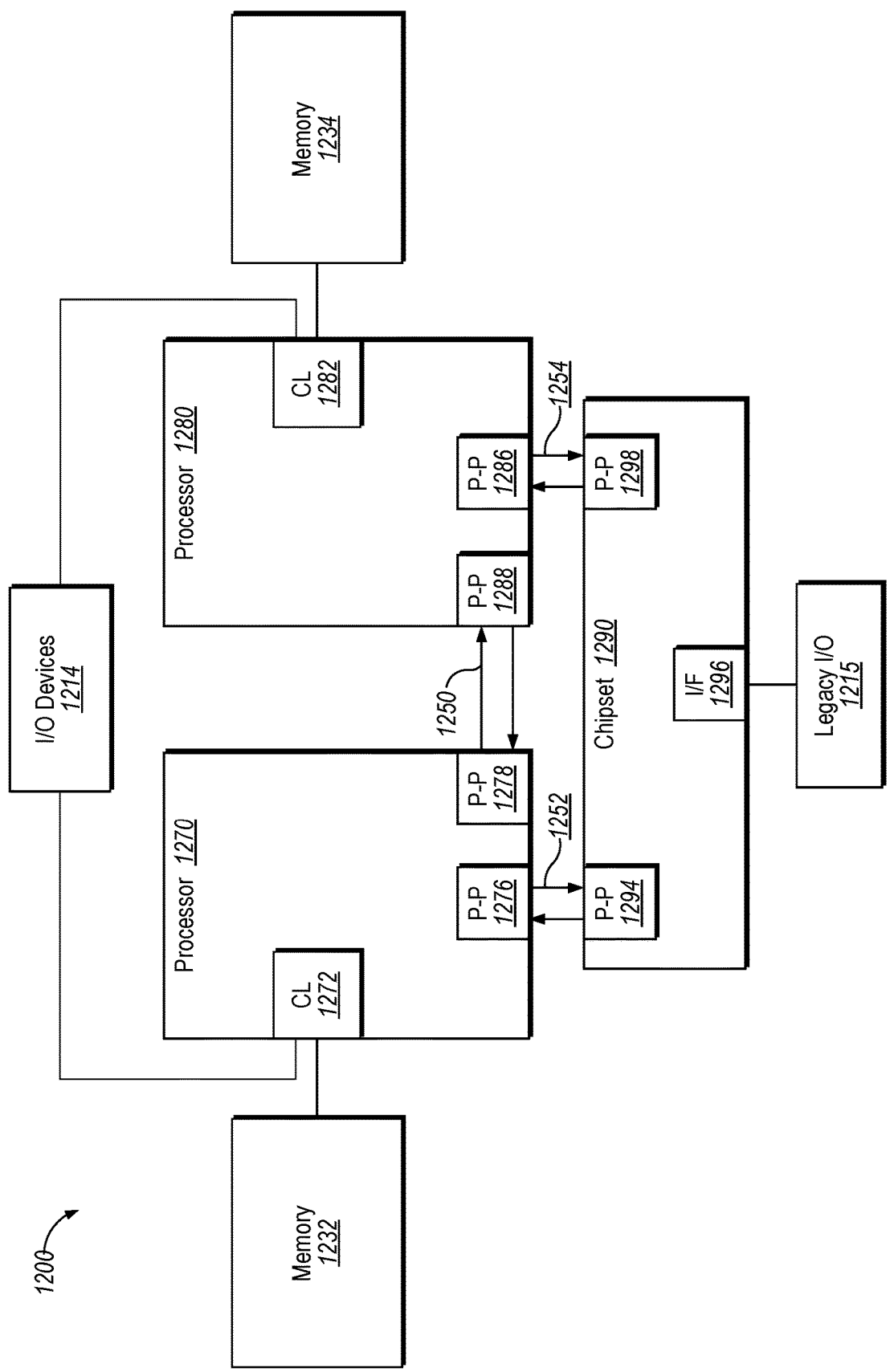
FIG. 12 is a block diagram of a system in which an embodiment of the disclosure may operate.

Referring now to FIG. 12, shown is a block diagram of a system 1200 in which an embodiment of the disclosure may operate. FIG. 12 illustrates processors 1270, 1280. In one embodiment, processors 1270, 1280 may implement distributed memory operations as described above. Processors 1270, 1280 may include integrated memory and I/O control logic ("CL") 1272 and 1282, respectively and intercommunicate with each other via point-to-point interconnect 1250 between point-to-point (P-P) interfaces 1278 and 1288 respectively. Processors 1270, 1280 each communicate with chipset 1290 via point-to-point interconnects 1252 and 1254 through the respective P-P interfaces 1276 to 1294 and 1286 to 1298 as shown. For at least one embodiment, the CL 1272, 1282 may include integrated memory controller units. CLs 1272, 1282 may include I/O control logic. As depicted, memories 1232, 1234 coupled to CLs 1272, 1282 and I/O devices 1214 are also coupled to the control logic 1272, 1282. Legacy I/O devices 1215 are coupled to the chipset 1290 via interface 1296.

Figure 13:
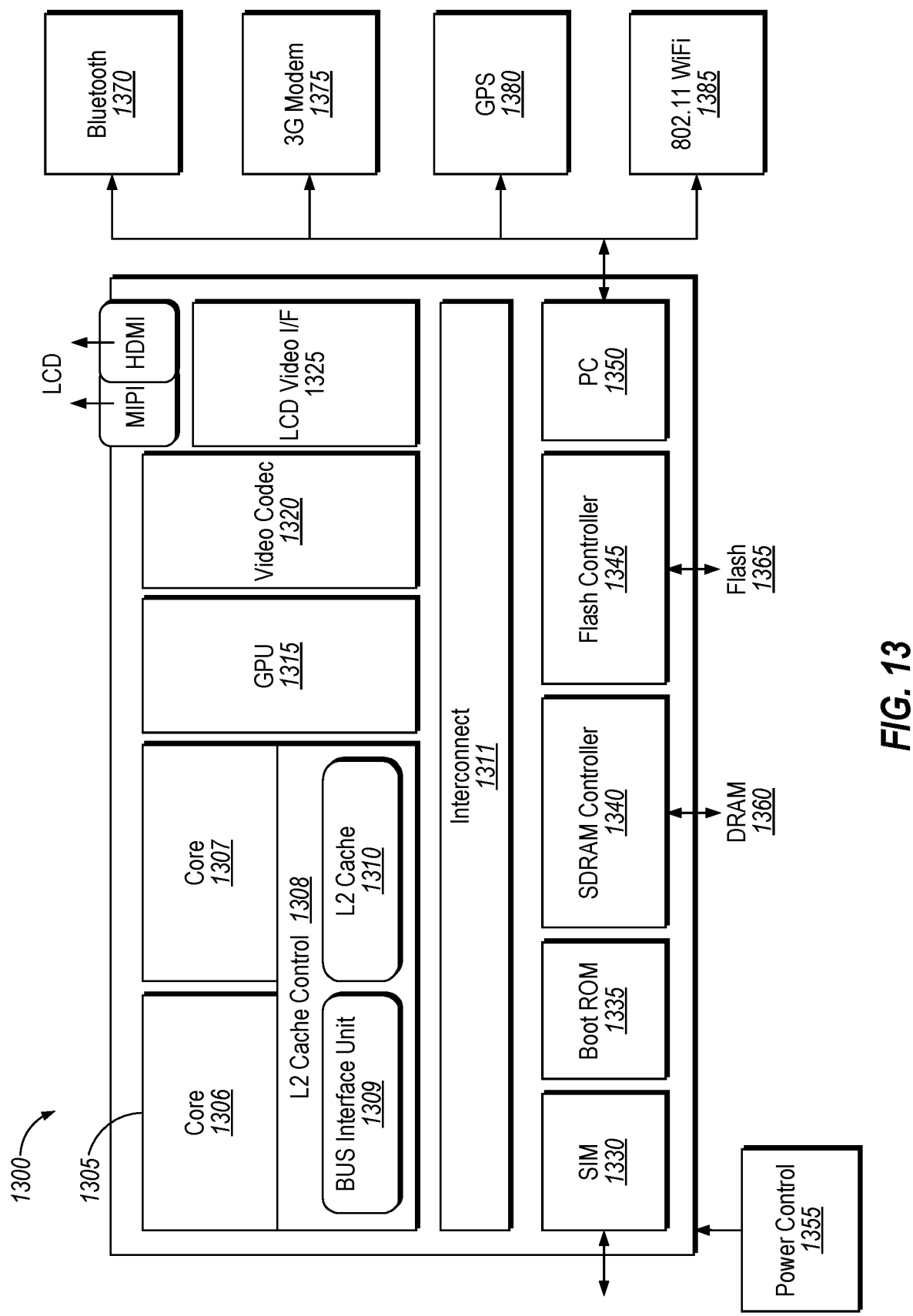
FIG. 13 is a block diagram of a computing system according to another embodiment of the disclosure.

FIG. 13 is a block diagram of an embodiment of a system on-chip (SOC) design in accordance with the present disclosure. As a specific illustrative example, SOC 1300 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1300 includes 2 cores—1306 and 1307. Cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1310 includes an on-chip interconnect, such as an IOSF, AMBA, or other interconnect discussed above, which potentially implements one or more aspects of the described disclosure.

Interface 1310 provides communication channels to the other components, such as a Subscriber Identity Module (SIM) 1330 to interface with a SIM card, a boot rom 1335 to hold boot code for execution by cores 1306 and 1307 to initialize and boot SOC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the disclosure described herein.

In one embodiment, the cores 1306 and 1307 also include logic to implement distributed memory operations according to embodiments of the present invention. For example, the cores 1306 and 1307 may include logic to execute a distributed channel module, such as distributed channel module 115 described with respect to FIG. 1, where the distributed channel module 115 can obtain distributed channel information for an algorithm to be executed and for each distributed channel in the distributed channel information, associate one or more spatially distributed processing elements with the distributed channel. In addition, upon determining that the distributed channel is associated with a memory operation, the distributed channel module 115 can allocate a memory port for the distributed channel. Moreover, the distributed channel module 115 can further maintain a multi-source completion buffer to dynamically allocate buffer slots among multiple sources without creating deadlocks. In addition, the distributed channel module 115 can further maintain an order of miss requests using an ordering buffer and service miss requests using the ordering buffer.

In addition, the system 1300 illustrates peripherals for communication, such as a Bluetooth module 1370, 3G modem 1375, GPS 1380, and WiFi 1385. Note as stated above, a UE includes a radio for communication. As a result, these peripheral communication modules are not all required. However, in a UE, some form a radio for external communication is to be included.

Figure 14:
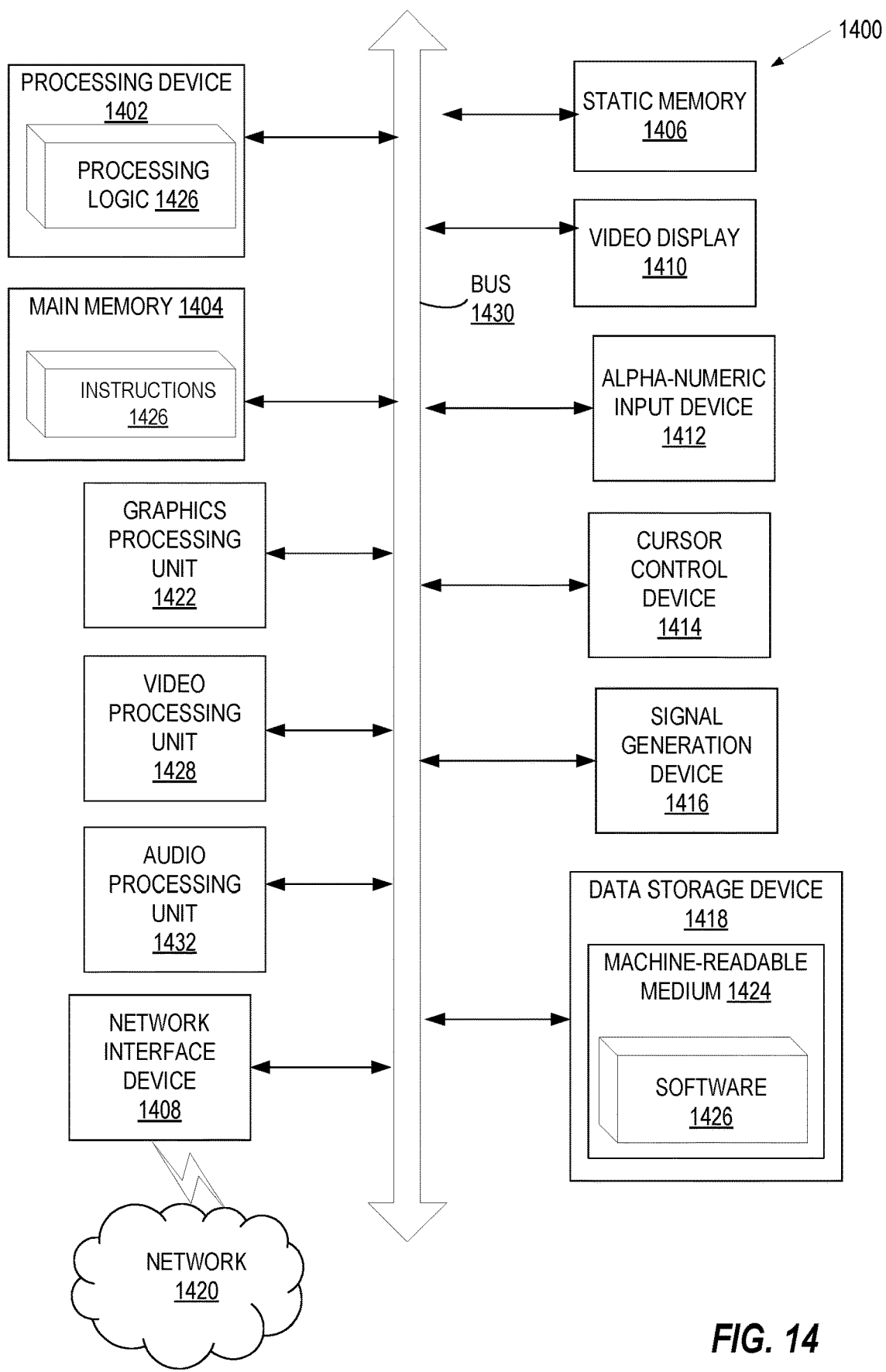
FIG. 14 is a block diagram of a computing system according to another embodiment of the disclosure.

FIG. 14 illustrates a diagrammatic representation of a machine in the example form of a computer system 1400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1400 includes a processing device 1402, a main memory 1404 (e.g., read-only memory (ROM), flash memory, dynamic random access memory (DRAM) (such as synchronous DRAM (SDRAM) or DRAM (RDRAM), etc.), a static memory 1406 (e.g., flash memory, static random access memory (SRAM), etc.), and a data storage device 1418, which communicate with each other via a bus 1430.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. In one embodiment, processing device 1402 may include one or processing cores. The processing device 1402 is configured to execute the processing logic 1426 for performing the operations and steps discussed herein. In one embodiment, processing device 1402 is the same as spatial processing unit 110 described with respect to FIG. 1 that implements distributed memory operations. For example, processing device 1402 may include a distributed channel module, such as distributed channel module 115 of FIG. 1.

The computer system 1400 may further include a network interface device 1408 communicably coupled to a network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker). Furthermore, computer system 1400 may include a graphics processing unit 1422, a video processing unit 1428, and an audio processing unit 1432.

The data storage device 1418 may include a machine-readable storage medium 1424 on which is stored software 1426 implementing any one or more of the methodologies of functions described herein, such as implementing distributed memory operations as described above. The software 1426 may also reside, completely or at least partially, within the main memory 1404 as instructions 1426 and/or within the processing device 1402 as processing logic 1426 during execution thereof by the computer system 1400; the main memory 1404 and the processing device 1402 also constituting machine-accessible storage media.

The machine-readable storage medium 1424 may also be used to store instructions 1426 implementing distributed memory operations, such as described with respect to computing system 100 in FIG. 1, and/or a software library containing methods that call the above applications. While the machine-readable storage medium 1424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instruction for execution by the machine and that cause the machine to perform any one or more of the methodologies of the disclosure. The term "machine-readable storage medium" shall accordingly be taken to include, but not be limited to, solid-state memories, and optical and magnetic media.

The following examples pertain to further embodiments.

Example 1 is an apparatus comprising: 1) a memory and 2) a processing device communicably coupled to the memory, the processing device to obtain distributed channel information for an algorithm to be executed by a plurality of spatially distributed processing elements, wherein the plurality of spatially distributed processing elements connect to a shared memory controller and for each distributed channel in the distributed channel information, associate one or more of the plurality of spatially distributed processing elements with the distributed channel based on the algorithm.

In Example 2, the processing device of Example 1 can optionally determine whether the distributed channel is associated with a memory operation for each distributed channel in the distributed channel information and upon determining the distributed channel is associated with a memory operation, allocate a memory port for the distributed channel to allow the distributed channel to perform the memory operation.

In Example 3, the memory operation is a load operation, and to associate one or more of the plurality of spatially distributed processing elements with the distributed channel, the processing device of Example 2 can optionally associate a first spatially distributed processing element of the plurality of spatially distributed processing elements with the distributed channel, wherein the first spatially distributed processing element is to generate a load request for the load operation to be sent to the memory using the distributed channel and associate a second spatially distributed processing element of the plurality of spatially distributed processing elements with the distributed channel, wherein the second spatially distributed processing element is to obtain load data associated with the load operation from the memory using the distributed channel.

In Example 4, the memory operation is a store operation, and the processing device of Example 2 can optionally associate a first spatially distributed processing element of the plurality of spatially distributed processing elements with a first distributed channel, wherein the first spatially distributed processing element is to generate a store address for the store operation to be sent to the memory using the first distributed channel and associate a second spatially distributed processing element of the plurality of spatially distributed processing elements with a second distributed channel, wherein the second spatially distributed processing element is to generate the store data for the store operation to be sent to the memory using the second distributed channel.

In Example 5, the processing device of Example 1 can optionally associate request information with a distributed channel, wherein the request information is used by the memory to determine information about a request from the distributed channel, and wherein the request from the distributed channel does not comprise the information.

In Example 6, the request information of Example 5 can optionally comprise at least one of: cacheable, not cacheable, coherent, incoherent, end of data, or atomic store.

In Example 7, the distributed channel information of Example 1 can optionally comprise at least one of a first distributed channel associated with store data, a second distributed channel associated with a store address, a third distributed channel associated with a load operation, or a fourth channel associated with an arithmetic operation.

In Example 8, the processing device of Example 1 can optionally obtain a memory request to be saved in a completion buffer, determine whether a predetermined number of slots remain in the completion buffer, save the memory request in the completion buffer upon determining that a predetermined number of slots do not remain in the completion buffer, determine whether the memory request is a load request upon determining that a predetermined number of slots remain in the completion buffer, determine whether a source associated with the load request has a destination credit upon determining the memory request is a load request, save the memory request in the completion buffer upon determining the source associated with the load request has a destination credit, and deny the memory request to be saved in the completion buffer until an additional slot is available in the completion buffer upon determining the source associated with the load request does not have a destination credit.

In Example 9, the processing device of Example 1 can optionally obtain a memory request to be saved in a completion buffer, determine whether a predetermined number of slots remain in the completion buffer, save the memory request in the completion buffer upon determining that a predetermined number of slots do not remain in the completion buffer, determine if the memory request is a store request upon determining that a predetermined number of slots remain in the completion buffer, and deny the memory request to be saved in the completion buffer until an additional slot is available in the completion buffer upon determining the memory request is a store request.

In Example 10, the processing device of Example 9 can optionally determine whether the memory request is a load request upon determining that a predetermined number of slots remain in the completion buffer, determine whether a source associated with the memory request has a destination credit upon determining that the memory request is a load request, wherein the destination credit defines a number of messages associated with the source that can be sent to a destination, save the memory request in the completion buffer upon determining that the source associated with the memory request does have a destination credit; determine whether an additional slot is available in the completion buffer upon determining that the source associated with the memory request does not have a destination credit, save the memory request in the completion buffer upon determining that an additional slot is available in the completion buffer, and determine whether the source associated with the memory request has a destination credit upon determining that an additional slot is not available in the completion buffer.

In Example 11, the processing device of Example 10 can optionally decrement the destination credit for the source upon determining that a message was sent to the destination and increment the destination credit for the source upon determining that a message was received by the destination.

In Example 12, the processing device of Example 1 can optionally obtain a first memory request associated with an address, allocate an entry in an ordering buffer for the first memory request, determine whether to maintain an order for the first memory request and a second memory request in the ordering buffer, and update the ordering buffer to include the order of the first memory request and the second memory request upon determining to maintain an order for the first memory request and a second memory request in the ordering buffer.

In Example 13, the ordering buffer of Example 12 can optionally coalesce memory requests to the address and the ordering buffer can optionally maintain an order between coalesced requests to the address and non-coalesced requests to the address.

In Example 14, the ordering buffer of Example 12 can optionally be shared by the plurality of spatially distributed processing elements.

In Example 15, the ordering buffer of Example 12 can optionally be implemented as a plurality of data structures, wherein each data structure of the plurality of data structures stores one or more requests associated with a specific address, and wherein each data structure of the plurality of data structure maintains an order of the one or more requests associated with the specific address.

In Example 16, the plurality of data structures of Example 15 can optionally comprise a linked list.

In Example 17, to determine whether to maintain an order for the first memory request and the second memory request in the ordering buffer, the processing device of Example 12 can optionally for each address associated with the ordering buffer: compare an address associated with the first memory request to the address associated with the ordering buffer, determine whether the address associated with the first memory request matches the address associated with the ordering buffer based on the comparison, and upon determining that the address associated with the first memory request matches the address associated with the ordering buffer, determine to maintain the order for the first memory request and the second memory request in the ordering buffer, wherein the second request is associated with the address associated with the ordering buffer that matches the address associated with the first memory request.

In Example 18, the processing device of Example 1 can optionally obtain data associated with an address, determine whether an entry with the address is in an ordering buffer, upon determining an entry with the address is in the ordering buffer service an entry associated with the address, wherein the oldest entry is determined based on an order of memory requests maintained by the ordering buffer, determine whether an additional entry associated with the address is in the ordering buffer, and upon determining that an additional entry associated with the address is in the ordering buffer, service the additional entry using the data, wherein the older entry was saved to the ordering buffer before the additional entry was saved to the ordering buffer.

In Example 19, to service the entry associated with the address, the processing device of Example 18 can optionally update a memory to comprise the data obtained upon determining that the entry associated with the address is associated with a store request and provide the data associated with the address to the load request upon determining that the entry associated with the address is associated with a load request.

Various embodiments may have different combinations of the operational features described above. For instance, all optional features of the apparatus described above may also be implemented with respect to a method or process described herein and specifics in the examples may be used anywhere in one or more embodiments.

Example 20 is a method for distributed memory operations comprising 1) obtaining distributed channel information for an algorithm to be executed by a plurality of spatially distributed processing elements, wherein the plurality of spatially distributed processing elements connect to a shared memory controller and 2) for each distributed channel in the distributed channel information, associating one or more of the plurality of spatially distributed processing elements with the distributed channel based on the algorithm.

In Example 21, the subject matter of Example 20 can optionally comprise determining whether the distributed channel is associated with a memory operation for each distributed channel in the distributed channel information and upon determining the distributed channel is associated with a memory operation, allocating a memory port for the distributed channel to allow the distributed channel to perform the memory operation.

In Example 22, the memory operation of Example 21 can optionally be a load operation, and to associate one or more of the plurality of spatially distributed processing elements with the distributed channel, the subject matter of Example 21 can optionally comprise associating a first spatially distributed processing element of the plurality of spatially distributed processing elements with the distributed channel, wherein the first spatially distributed processing element is to generate a load request for the load operation to be sent to the memory using the distributed channel and associating a second spatially distributed processing element of the plurality of spatially distributed processing elements with the distributed channel, wherein the second spatially distributed processing element is to obtain load data associated with the load operation from the memory using the distributed channel.

In Example 23, the memory operation of Example 21 can optionally be a store operation, and the subject matter of Example 21 can optionally comprise associating a first spatially distributed processing element of the plurality of spatially distributed processing elements with a first distributed channel, wherein the first spatially distributed processing element is to generate a store address for the store operation to be sent to the memory using the first distributed channel and associating a second spatially distributed processing element of the plurality of spatially distributed processing elements with a second distributed channel, wherein the second spatially distributed processing element is to generate the store data for the store operation to be sent to the memory using the second distributed channel.

In Example 24, the subject matter of Example 20 can optionally comprise associating request information with a distributed channel, wherein the request information is used by the memory to determine information about a request from the distributed channel, and wherein the request from the distributed channel does not comprise the information.

In Example 25, the request information of Example 24 can optionally comprise at least one of: cacheable, not cacheable, coherent, incoherent, end of data, or atomic store.

In Example 26, the distributed channel information of Example 20 can optionally comprise at least one of a first distributed channel associated with store data, a second distributed channel associated with a store address, a third distributed channel associated with a load operation, or a fourth channel associated with an arithmetic operation.

In Example 27, the subject matter of Example 20 can optionally comprise obtaining a memory request to be saved in a completion buffer, determining whether a predetermined number of slots remain in the completion buffer, saving the memory request in the completion buffer upon determining that a predetermined number of slots do not remain in the completion buffer, upon determining that a predetermined number of slots remain in the completion buffer: determining whether the memory request is a load request, upon determining the memory request is a load request, determining whether a source associated with the load request has a destination credit, upon determining the source associated with the load request has a destination credit, saving the memory request in the completion buffer, and upon determining the source associated with the load request does not have a destination credit, denying the memory request to be saved in the completion buffer until an additional slot is available in the completion buffer.

In Example 28, the subject matter of Example 20 can optionally comprise obtaining a memory request to be saved in a completion buffer, determining whether a predetermined number of slots remain in the completion buffer, upon determining that a predetermined number of slots do not remain in the completion buffer, saving the memory request in the completion buffer, upon determining that a predetermined number of slots remain in the completion buffer: determining if the memory request is a store request, and upon determining the memory request is a store request, denying the memory request to be saved in the completion buffer until an additional slot is available in the completion buffer.

In Example 29, the subject matter of Example 28 can optionally comprise upon determining that a predetermined number of slots remain in the completion buffer: determining whether the memory request is a load request, upon determining that the memory request is a load request, determining whether a source associated with the memory request has a destination credit, wherein the destination credit defines a number of messages associated with the source that can be sent to a destination, upon determining that the source associated with the memory request does have a destination credit, saving the memory request in the completion buffer, upon determining that the source associated with the memory request does not have a destination credit, determining whether an additional slot is available in the completion buffer, upon determining that an additional slot is available in the completion buffer, saving the memory request in the completion buffer, and upon determining that an additional slot is not available in the completion buffer, determining whether the source associated with the memory request has a destination credit.

In Example 30, the subject matter of Example 29 can optionally comprise upon determining that a message was sent to the destination, decrementing the destination credit for the source and upon determining that a message was received by the destination, incrementing the destination credit for the source.

In Example 31, the subject matter of Example 20 can optionally comprise obtaining a first memory request associated with an address, allocating an entry in an ordering buffer for the first memory request, determining whether to maintain an order for the first memory request and a second memory request in the ordering buffer, and upon determining to maintain an order for the first memory request and a second memory request in the ordering buffer, updating the ordering buffer to include the order of the first memory request and the second memory request.

In Example 32, the ordering buffer of Example 31 can optionally coalesce memory requests to the address and can optionally maintain an order between coalesced requests to the address and non-coalesced requests to the address.

In Example 33, the ordering buffer of Example 31 can optionally be shared by the plurality of spatially distributed processing elements.

In Example 34, the ordering buffer of Example 31 can optionally be implemented as a plurality of data structures, wherein each data structure of the plurality of data structures stores one or more requests associated with a specific address, and wherein each data structure of the plurality of data structure maintains an order of the one or more requests associated with the specific address.

In Example 35 the plurality of data structures of Example 34 can optionally comprise a linked list.

In Example 36, determining whether to maintain an order for the first memory request and the second memory request in the ordering buffer of Example 31 can optionally comprise for each address associated with the ordering buffer, comparing an address associated with the first memory request to the address associated with the ordering buffer, determining whether the address associated with the first memory request matches the address associated with the ordering buffer based on the comparison, and upon determining that the address associated with the first memory request matches the address associated with the ordering buffer, determining to maintain the order for the first memory request and the second memory request in the ordering buffer, wherein the second request is associated with the address associated with the ordering buffer that matches the address associated with the first memory request.

In Example 37, the subject matter of Example 31 can optionally comprise obtaining data associated with an address, determining whether an entry with the address is in an ordering buffer, upon determining an entry with the address is in the ordering buffer, servicing an entry associated with the address, wherein the oldest entry is determined based on an order of memory requests maintained by the ordering buffer, determining whether an additional entry associated with the address is in the ordering buffer, and upon determining that an additional entry associated with the address is in the ordering buffer, servicing the additional entry using the data, wherein the older entry was saved to the ordering buffer before the additional entry was saved to the ordering buffer.

In Example 38, servicing the entry associated with the address of Example 37 can optionally comprise upon determining that the entry associated with the address is associated with a store request, updating a memory to comprise the data obtained, and upon determining that the entry associated with the address is associated with a load request, providing the data associated with the address to the load request.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 39 is a non-transitory machine-readable storage medium including instructions that, when executed by a processing device, cause the device to perform operations comprising 1) obtaining distributed channel information for an algorithm to be executed by a plurality of spatially distributed processing elements, wherein the plurality of spatially distributed processing elements connect to a shared memory controller; and 2) for each distributed channel in the distributed channel information, associating one or more of the plurality of spatially distributed processing elements with the distributed channel based on the algorithm.

In Example 40, the operations of Example 39 can optionally comprise for each distributed channel in the distributed channel information: determining whether the distributed channel is associated with a memory operation, and upon determining the distributed channel is associated with a memory operation, allocating a memory port for the distributed channel to allow the distributed channel to perform the memory operation.

In Example 41, wherein the memory operation of Example 40 can optionally be a load operation, and to associate one or more of the plurality of spatially distributed processing elements with the distributed channel, the operations of Example 40 can optionally comprise associating a first spatially distributed processing element of the plurality of spatially distributed processing elements with the distributed channel, wherein the first spatially distributed processing element is to generate a load request for the load operation to be sent to the memory using the distributed channel and associating a second spatially distributed processing element of the plurality of spatially distributed processing elements with the distributed channel, wherein the second spatially distributed processing element is to obtain load data associated with the load operation from the memory using the distributed channel.

In Example 42, the memory operation of Example 40 can optionally be a store operation, and the operations of Example 40 can optionally comprise associating a first spatially distributed processing element of the plurality of spatially distributed processing elements with a first distributed channel, wherein the first spatially distributed processing element is to generate a store address for the store operation to be sent to the memory using the first distributed channel and associating a second spatially distributed processing element of the plurality of spatially distributed processing elements with a second distributed channel, wherein the second spatially distributed processing element is to generate the store data for the store operation to be sent to the memory using the second distributed channel.

In Example 43, the operations of Example 39 can optionally comprise associating request information with a distributed channel, wherein the request information is used by the memory to determine information about a request from the distributed channel, and wherein the request from the distributed channel does not comprise the information.

In Example 44, the operations of Example 39 can optionally comprise obtaining a memory request to be saved in a completion buffer, determining whether a predetermined number of slots remain in the completion buffer, upon determining that a predetermined number of slots do not remain in the completion buffer, saving the memory request in the completion buffer, upon determining that a predetermined number of slots remain in the completion buffer: determining whether the memory request is a load request, upon determining the memory request is a load request, determining whether a source associated with the load request has a destination credit, upon determining the source associated with the load request has a destination credit, saving the memory request in the completion buffer, and upon determining the source associated with the load request does not have a destination credit, denying the memory request to be saved in the completion buffer until an additional slot is available in the completion buffer.

In Example 45, the operations of Example 39 can optionally comprise obtaining a memory request to be saved in a completion buffer, determining whether a predetermined number of slots remain in the completion buffer, upon determining that a predetermined number of slots do not remain in the completion buffer, saving the memory request in the completion buffer, upon determining that a predetermined number of slots remain in the completion buffer: determining if the memory request is a store request and upon determining the memory request is a store request, denying the memory request to be saved in the completion buffer until an additional slot is available in the completion buffer.

In Example 46, the operations of Example 45 can optionally comprise upon determining that a predetermined number of slots remain in the completion buffer: determining whether the memory request is a load request, upon determining that the memory request is a load request, determining whether a source associated with the memory request has a destination credit, wherein the destination credit defines a number of messages associated with the source that can be sent to a destination, upon determining that the source associated with the memory request does have a destination credit, saving the memory request in the completion buffer, upon determining that the source associated with the memory request does not have a destination credit, determining whether an additional slot is available in the completion buffer, upon determining that an additional slot is available in the completion buffer, saving the memory request in the completion buffer, and upon determining that an additional slot is not available in the completion buffer, determining whether the source associated with the memory request has a destination credit.

In Example 47, the operations of Example 46 can optionally comprise upon determining that a message was sent to the destination, decrementing the destination credit for the source and upon determining that a message was received by the destination, incrementing the destination credit for the source.

In Example 48, the operations of Example 39 can optionally comprise obtaining a first memory request associated with an address, allocating an entry in an ordering buffer for the first memory request, determining whether to maintain an order for the first memory request and a second memory request in the ordering buffer, and upon determining to maintain an order for the first memory request and a second memory request in the ordering buffer, updating the ordering buffer to include the order of the first memory request and the second memory request.

In Example 49, to determine whether to maintain an order for the first memory request and the second memory request in the ordering buffer, the operations of Example 48 can optionally comprise for each address associated with the ordering buffer, comparing an address associated with the first memory request to the address associated with the ordering buffer, determining whether the address associated with the first memory request matches the address associated with the ordering buffer based on the comparison, and upon determining that the address associated with the first memory request matches the address associated with the ordering buffer, determining to maintain the order for the first memory request and the second memory request in the ordering buffer, wherein the second request is associated with the address associated with the ordering buffer that matches the address associated with the first memory request.

In Example 50, the operations of Example 48 can optionally comprise obtaining data associated with an address, determining whether an entry with the address is in an ordering buffer, upon determining an entry with the address is in the ordering buffer servicing an entry associated with the address, wherein the oldest entry is determined based on an order of memory requests maintained by the ordering buffer, determining whether an additional entry associated with the address is in the ordering buffer, and upon determining that an additional entry associated with the address is in the ordering buffer, servicing the additional entry using the data, wherein the older entry was saved to the ordering buffer before the additional entry was saved to the ordering buffer.

In Example 51, to service the entry associated with the address, the operations of Example 48 can optionally comprise upon determining that the entry associated with the address is associated with a store request, updating a memory to comprise the data obtained and upon determining that the entry associated with the address is associated with a load request, providing the data associated with the address to the load request.

Example 52 is a processing device comprising a channel association module to obtain distributed channel information for an algorithm to be executed by a plurality of spatially distributed processing elements, wherein the plurality of spatially distributed processing elements connect to a shared memory controller and associate one or more of the plurality of spatially distributed processing elements with the distributed channel based on the algorithm for each distributed channel in the distributed channel information.

In Example 53, the channel association module of Example 52 can optionally, for each distributed channel in the distributed channel information, determine whether the distributed channel is associated with a memory operation and upon determining the distributed channel is associated with a memory operation, allocate a memory port for the distributed channel to allow the distributed channel to perform the memory operation.

In Example 54, the memory operation of Example 53 can optionally be a load operation, and to associate one or more of the plurality of spatially distributed processing elements with the distributed channel, the channel association module of Example 53 can optionally associate a first spatially distributed processing element of the plurality of spatially distributed processing elements with the distributed channel, wherein the first spatially distributed processing element is to generate a load request for the load operation to be sent to the memory using the distributed channel and associate a second spatially distributed processing element of the plurality of spatially distributed processing elements with the distributed channel, wherein the second spatially distributed processing element is to obtain load data associated with the load operation from the memory using the distributed channel.

In Example 55, the memory operation of Example 53 can optionally be a store operation, and the channel association module of Example 53 can optionally associate a first spatially distributed processing element of the plurality of spatially distributed processing elements with a first distributed channel, wherein the first spatially distributed processing element is to generate a store address for the store operation to be sent to the memory using the first distributed channel and associate a second spatially distributed processing element of the plurality of spatially distributed processing elements with a second distributed channel, wherein the second spatially distributed processing element is to generate the store data for the store operation to be sent to the memory using the second distributed channel.

In Example 56, the channel association module can optionally associate request information with a distributed channel, wherein the request information is used by the memory to determine information about a request from the distributed channel, and wherein the request from the distributed channel does not comprise the information.

In Example 57, the processing device of Example 52 can optionally comprise a completion buffer module to obtain a memory request to be saved in a completion buffer, to determine whether a predetermined number of slots remain in the completion buffer, to save the memory request in the completion buffer upon determining that a predetermined number of slots do not remain in the completion buffer, to determine whether the memory request is a load request upon determining that a predetermined number of slots remain in the completion buffer, to determine whether a source associated with the load request has a destination credit upon determining the memory request is a load request, to save the memory request in the completion buffer upon determining the source associated with the load request has a destination credit, and to deny the memory request to be saved in the completion buffer until an additional slot is available in the completion buffer upon determining the source associated with the load request does not have a destination credit.

In Example 58, the processing device of Example 52 can optionally comprise a completion buffer module to obtain a memory request to be saved in a completion buffer, to determine whether a predetermined number of slots remain in the completion buffer, to save the memory request in the completion buffer upon determining that a predetermined number of slots do not remain in the completion buffer, to determine whether the memory request is a store request upon determining that a predetermined number of slots remain in the completion buffer, and to deny the memory request to be saved in the completion buffer until an additional slot is available in the completion buffer upon determining the memory request is a store request.

In Example 59, the processing device of Example 52 can optionally comprise an ordering buffer module to obtain a first memory request associated with an address, to allocate an entry in an ordering buffer for the first memory request, to determine whether to maintain an order for the first memory request and a second memory request in the ordering buffer, and to update the ordering buffer to include the order of the first memory request and the second memory request upon determining to maintain an order for the first memory request and a second memory request in the ordering buffer.

In Example 60, the processing device of Example 52 can optionally comprise an ordering buffer module to obtain data associated with an address, to determine whether an entry with the address is in an ordering buffer, to service an entry associated with the address upon determining an entry with the address is in the ordering buffer, wherein the oldest entry is determined based on an order of memory requests maintained by the ordering buffer, to determine whether an additional entry associated with the address is in the ordering buffer, and to service the additional entry using the data upon determining that an additional entry associated with the address is in the ordering buffer, wherein the older entry was saved to the ordering buffer before the additional entry was saved to the ordering buffer.

Example 61 is an apparatus comprising means obtaining distributed channel information for an algorithm to be executed by a plurality of spatially distributed processing elements, wherein the plurality of spatially distributed processing elements connect to a shared memory controller and for each distributed channel in the distributed channel information, means for associating one or more of the plurality of spatially distributed processing elements with the distributed channel based on the algorithm.

In Example 62, the apparatus of Example 61 can optionally be configured to perform the method of any one of the Example 21 to 38.

Example 63 is at least one machine readable medium comprising a plurality of instructions that in response to being executed on a computing device, cause the computing device to carry out a method according to any one of Examples 20 to 38.

Example 64 is an apparatus for implementing distributed memory operations, configured to perform the method of any one of the Examples 20 to 38.

Example 65 is an apparatus comprising: means for performing the method of any one of claims 20 to 38.

In the foregoing description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "generating", "determining", "creating", "translating", "discarding", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The disclosure may be provided as a computer program product, or software, that may include a machine-readable medium having stored thereon instructions, which may be used to program a computer system (or other electronic devices) to perform a process according to the disclosure. A machine-readable medium includes any technology for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. An apparatus comprising:
    a first memory;
    a processor coupled to the first memory; and
    a spatial processing unit coupled to the first memory, the spatial processing unit comprising:
        a second memory,
        a plurality of distributed processing elements coupled together according to an algorithm mapped onto the plurality of distributed processing elements,
        a plurality of distributed channels of an interconnection network to connect the plurality of distributed processing elements to memory ports of the second memory, and
        a distributed channel circuit to:
            associate a first distributed channel of the plurality of distributed channels with a first distributed processing element of the plurality of distributed processing elements based on distributed channel information for the algorithm, wherein the first distributed channel is a first type of channel for load requests to the second memory,
            associate a second distributed channel of the plurality of distributed channels with a second distributed processing element of the plurality of distributed processing elements based on the distributed channel information for the algorithm, wherein the second distributed channel is a second type of channel for store requests to the second memory,
            allocate a first memory port of the second memory for the first distributed channel, and
            allocate a second memory port of the second memory for the second distributed channel.

2. The apparatus of claim 1, wherein the second distributed channel is the second type of channel for store addresses of store requests to the second memory, and the spatial processing unit is further to configure the second distributed processing element of the plurality of distributed processing elements to generate the store addresses for the store requests.

3. The apparatus of claim 2, wherein the distributed channel circuit is to associate a third distributed channel of the plurality of distributed channels with a third distributed processing element of the plurality of distributed processing elements based on the distributed channel information for the algorithm, the third distributed channel is a third type of channel for store data for the store addresses of the store requests to the second memory, and the spatial processing unit is further to configure the third distributed processing element of the plurality of distributed processing elements to generate the store data for the store requests based on the algorithm.

4. The apparatus of claim 1, wherein the spatial processing unit is further to associate request information with each distributed channel instead of including the request information in the requests, and the request information is used by the second memory to determine a load type or a store type of operation for the requests received from a respective distributed channel.

5. The apparatus of claim 1, wherein the spatial processing unit is further to:
obtain a memory request to be saved in a completion buffer;
determine if a predetermined number of slots remain in the completion buffer;
in response to determining that the predetermined number of slots do not remain in the completion buffer, save the memory request in the completion buffer; and
in response to determining that the predetermined number of slots remain in the completion buffer:
determine that the memory request is a load request,
determine, in response to determining that the memory request is a load request, whether a source channel of the plurality of distributed channels associated with the load request has a destination credit, wherein the destination credit comprises a number of messages associated with the source channel that can be sent to a destination channel,
in response to determining the source channel associated with the load request has the destination credit, save the memory request in the completion buffer, and
in response to determining the source channel associated with the load request does not have the destination credit, deny the memory request to be saved in the completion buffer until an additional slot is available in the completion buffer.

6. The apparatus of claim 1, wherein the spatial processing unit is further to:
obtain a memory request to be saved in a completion buffer;
determine that the memory request is a store request; and
in response to determining the memory request is the store request, deny the memory request to be saved in the completion buffer until an additional slot is available in the completion buffer.

7. The apparatus of claim 1, wherein the spatial processing unit is further to:
obtain a first memory request associated with an address;
allocate an entry in an ordering buffer for the first memory request;
determine whether to maintain an order for the first memory request and a second memory request in the ordering buffer; and
in response to determining to maintain an order for the first memory request and the second memory request in the ordering buffer, update the ordering buffer to include the order of the first memory request and the second memory request.

8. The apparatus of claim 1, wherein the spatial processing unit is further to:
obtain data associated with an address;
determine whether an entry in an ordering buffer is associated with the address in the ordering buffer;
in response to determining the entry in the ordering buffer is associated with the address in the ordering buffer, perform an operation on the entry associated with the address, wherein an older entry is determined based on an order of memory requests maintained by the ordering buffer;
determine whether an additional entry associated with the address is in the ordering buffer; and
in response to determining that an additional entry is associated with the address is in the ordering buffer, perform an operation on the additional entry using the data associated with the address, wherein the older entry was saved to the ordering buffer before the additional entry was saved to the ordering buffer.

9. A method comprising:
coupling a plurality of distributed processing elements of a spatial processing unit together according to an algorithm mapped onto the plurality of distributed processing elements;
configuring a first distributed processing element of the plurality of distributed processing elements to generate load requests for the algorithm to a memory of the spatial processing unit;
configuring a second distributed processing element of the plurality of distributed processing elements to generate store requests for the algorithm to the memory;
associating a first distributed channel of a plurality of distributed channels with the first distributed processing element of the plurality of distributed processing elements based on distributed channel information for the algorithm, wherein the first distributed channel is a first type of channel for load requests to the memory;
associating a second distributed channel of the plurality of distributed channels with the second distributed processing element of the plurality of distributed processing elements based on the distributed channel information for the algorithm, wherein the second distributed channel is a second type of channel for store requests to the memory;
allocating a first memory port of the memory for the first distributed channel;
allocating a second memory port of the memory for the second distributed channel;
sending load requests for the memory, generated by execution of the first distributed processing element, to the first distributed channel; and
sending store requests for the memory, generated by execution of the second distributed processing element, to the second distributed channel.

10. The method of claim 9, wherein the second distributed channel is the second type of channel for store addresses of store requests to the memory, and further comprising configuring the second distributed processing element of the plurality of distributed processing elements to generate the store addresses for the store requests.

11. The method of claim 10, further comprising:
associating a third distributed channel of the plurality of distributed channels with a third distributed processing element of the plurality of distributed processing elements based on the distributed channel information for the algorithm, wherein the third distributed channel is a third type of channel for store data for the store addresses of the store requests to the memory; and configuring the third distributed processing element of the plurality of distributed processing elements to generate the store data for the store requests.

12. The method of claim 9, further comprising associating request information with each distributed channel instead of including the request information in the requests, wherein the request information is used by the memory to determine a load type or a store type of operation for the requests received from a respective distributed channel.

13. The method of claim 9, further comprising:
obtaining a memory request to be saved in a completion buffer;
determining if a predetermined number of slots remain in the completion buffer;
in response to determining that the predetermined number of slots do not remain in the completion buffer, saving the memory request in the completion buffer; and
in response to determining that the predetermined number of slots remain in the completion buffer:
determining that the memory request is a load request,
determining, in response to determining that the memory request is a load request, whether a source channel of the plurality of distributed channels associated with the load request has a destination credit, wherein the destination credit comprises a number of messages associated with the source channel that can be sent to a destination channel,
in response to determining the source channel associated with the load request has the destination credit, saving the memory request in the completion buffer, and
in response to determining the source channel associated with the load request does not have the destination credit, denying the memory request to be saved in the completion buffer until an additional slot is available in the completion buffer.

14. The method of claim 9, further comprising:
obtaining a memory request to be saved in a completion buffer;
determining that the memory request is a store request; and
in response to determining the memory request is the store request, denying the memory request to be saved in the completion buffer until an additional slot is available in the completion buffer.

15. The method of claim 9, further comprising:
obtaining a first memory request associated with an address;
allocating an entry in an ordering buffer for the first memory request;
determining whether to maintain an order for the first memory request and a second memory request in the ordering buffer; and
in response to determining to maintain an order for the first memory request and the second memory request in the ordering buffer, updating the ordering buffer to include the order of the first memory request and the second memory request.

16. The method of claim 9, further comprising:
obtaining data associated with an address;
determining whether an entry in an ordering buffer is associated with the address in the ordering buffer;
in response to determining the entry in the ordering buffer is associated with the address in the ordering buffer, performing an operation on the entry associated with the address, wherein an older entry is determined based on an order of memory requests maintained by the ordering buffer;
determining whether an additional entry associated with the address is in the ordering buffer; and
in response to determining that an additional entry is associated with the address is in the ordering buffer, performing an operation on the additional entry using the data associated with the address, wherein the older entry was saved to the ordering buffer before the additional entry was saved to the ordering buffer.

17. A non-transitory machine readable medium that stores program code that when executed by a machine causes the machine to perform a method comprising:
coupling a plurality of distributed processing elements of a spatial processing unit together according to an algorithm mapped onto the plurality of distributed processing elements;
configuring a first distributed processing element of the plurality of distributed processing elements to generate load requests for the algorithm to a memory of the spatial processing unit;
configuring a second distributed processing element of the plurality of distributed processing elements to generate store requests for the algorithm to the memory;
associating a first distributed channel of a plurality of distributed channels with the first distributed processing element of the plurality of distributed processing elements based on distributed channel information for the algorithm, wherein the first distributed channel is a first type of channel for load requests to the memory;
associating a second distributed channel of the plurality of distributed channels with the second distributed processing element of the plurality of distributed processing elements based on the distributed channel information for the algorithm, wherein the second distributed channel is a second type of channel for store requests to the memory;
allocating a first memory port of the memory for the first distributed channel;
allocating a second memory port of the memory for the second distributed channel;
sending load requests for the memory, generated by execution of the first distributed processing element, to the first distributed channel; and
sending store requests for the memory, generated by execution of the second distributed processing element, to the second distributed channel.

18. The non-transitory machine readable medium of claim 17, wherein the second distributed channel is the second type of channel for store addresses of store requests to the memory, and further comprising configuring the second distributed processing element of the plurality of distributed processing elements to generate the store addresses for the store requests.

19. The non-transitory machine readable medium of claim 18, further comprising:
associating a third distributed channel of the plurality of distributed channels with a third distributed processing element of the plurality of distributed processing elements based on the distributed channel information for the algorithm, wherein the third distributed channel is a third type of channel for store data for the store addresses of the store requests to the memory; and
configuring the third distributed processing element of the plurality of distributed processing elements to generate the store data for the store requests.

20. The non-transitory machine readable medium of claim 17, further comprising associating request information with each distributed channel instead of including the request information in the requests, wherein the request information is used by the memory to determine a load type or a store type of operation for the requests received from a respective distributed channel.

21. The non-transitory machine readable medium of claim 17, further comprising:
obtaining a memory request to be saved in a completion buffer;
determining if a predetermined number of slots remain in the completion buffer;
in response to determining that the predetermined number of slots do not remain in the completion buffer, saving the memory request in the completion buffer; and
in response to determining that the predetermined number of slots remain in the completion buffer:
 determining that the memory request is a load request,
 determining, in response to determining that the memory request is a load request, whether a source channel of the plurality of distributed channels associated with the load request has a destination credit, wherein the destination credit comprises a number of messages associated with the source channel that can be sent to a destination channel,
 in response to determining the source channel associated with the load request has the destination credit, saving the memory request in the completion buffer, and
 in response to determining the source channel associated with the load request does not have the destination credit, denying the memory request to be saved in the completion buffer until an additional slot is available in the completion buffer.

22. The non-transitory machine readable medium of claim 17, further comprising:
obtaining a memory request to be saved in a completion buffer;
determining that the memory request is a store request; and
in response to determining the memory request is the store request, denying the memory request to be saved in the completion buffer until an additional slot is available in the completion buffer.

23. The non-transitory machine readable medium of claim 17, further comprising:
obtaining a first memory request associated with an address;
allocating an entry in an ordering buffer for the first memory request;
determining whether to maintain an order for the first memory request and a second memory request in the ordering buffer; and
in response to determining to maintain an order for the first memory request and the second memory request in the ordering buffer, updating the ordering buffer to include the order of the first memory request and the second memory request.

24. The non-transitory machine readable medium of claim 17, further comprising:
obtaining data associated with an address;
determining whether an entry in an ordering buffer is associated with the address in the ordering buffer;
in response to determining the entry in the ordering buffer is associated with the address in the ordering buffer, performing an operation on the entry associated with the address, wherein an older entry is determined based on an order of memory requests maintained by the ordering buffer;
determining whether an additional entry associated with the address is in the ordering buffer; and
in response to determining that an additional entry is associated with the address is in the ordering buffer, performing an operation on the additional entry using the data associated with the address, wherein the older entry was saved to the ordering buffer before the additional entry was saved to the ordering buffer.

* * * * *